United States Patent
Kurosaki

(10) Patent No.: US 9,853,919 B2
(45) Date of Patent: Dec. 26, 2017

(54) DATA PROCESSING APPARATUS AND DATA PROCESSING METHOD

(71) Applicant: FUJITSU LIMITED, Kawasaki-shi, Kanagawa (JP)

(72) Inventor: Hiroshi Kurosaki, Oyama (JP)

(73) Assignee: FUJITSU LIMITED, Kawasaki (JP)

( * ) Notice: Subject to any disclaimer, the term of this patent is extended or adjusted under 35 U.S.C. 154(b) by 427 days.

(21) Appl. No.: 14/167,231

(22) Filed: Jan. 29, 2014

(65) Prior Publication Data

US 2014/0297907 A1 Oct. 2, 2014

(30) Foreign Application Priority Data

Mar. 26, 2013 (JP) ................. 2013-065272

(51) Int. Cl.
 *G06F 5/14* (2006.01)
 *H04L 12/861* (2013.01)
(52) U.S. Cl.
 CPC ..................... *H04L 49/90* (2013.01)
(58) Field of Classification Search
 CPC ..................... G06F 5/14; H04L 49/90
 See application file for complete search history.

(56) References Cited

U.S. PATENT DOCUMENTS 5,764,243 A * 6/1998 Baldwin .................. G06F 3/14
  345/506
6,658,578 B1 * 12/2003 Laurenti .................. G06F 5/01
  712/244
7,330,858 B1 * 2/2008 Karr ....................... G06F 3/0611
2008/0155202 A1 6/2008 Kurosaki
2011/0219208 A1 * 9/2011 Asaad .................... G06F 15/76
  712/12

FOREIGN PATENT DOCUMENTS

| JP | 7-321795 | 12/1995 |
| JP | 07321795 A * | 12/1995 |
| JP | 9-305493 | 11/1997 |
| JP | 2008-160705 | 7/2008 |
| JP | 2011-2341114 | 11/2011 |

OTHER PUBLICATIONS

Office Action issued by the Patent Office of Japan dated Oct. 11, 2016 in corresponding Japanese patent application No. 2013-065272.

* cited by examiner

*Primary Examiner* — Henry Tsai
*Assistant Examiner* — John Roche
(74) *Attorney, Agent, or Firm* — Staas & Halsey LLP

(57) ABSTRACT

A data processing apparatus includes a shared buffer; an issuing unit that issues a write address for writing incoming data to the shared buffer; a receiving unit that receives a returned read address for the data read from the shared buffer; a monitoring buffer that saves information indicating use status of an address for the shared buffer; and a monitoring unit that monitors write address issuance and returned read address reception, changes the information for the write address, from an unused state to a used state, when the write address is issued, and changes the information for a read address to be returned, from a used state to an unused state when the returned read address is received. The monitoring unit determines the address for the shared buffer is overlapping, when the information for the write address indicates a used state when the write address is issued.

4 Claims, 12 Drawing Sheets

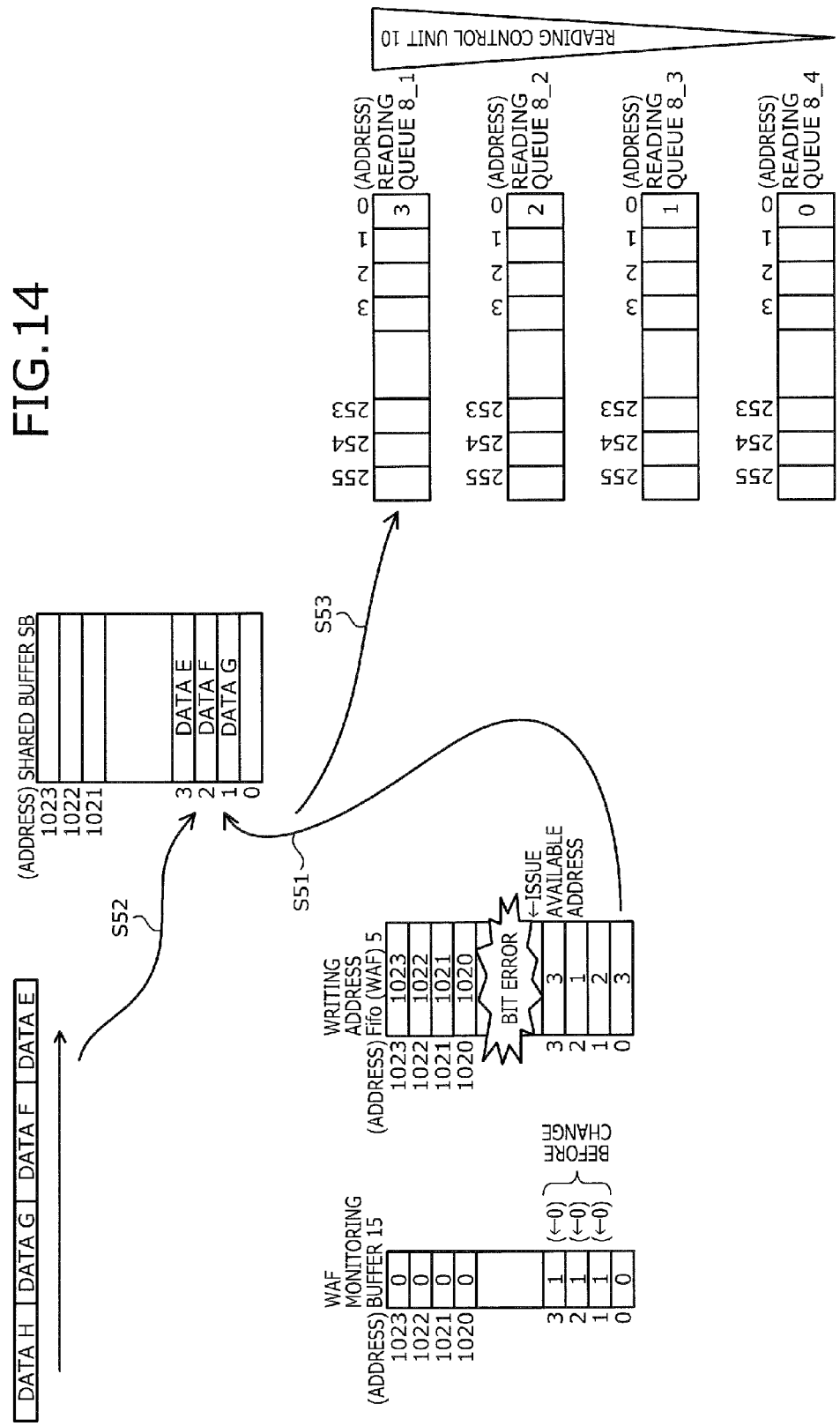

DATA PROCESSING APPARATUS AND DATA PROCESSING METHOD

CROSS REFERENCE TO RELATED APPLICATIONS

This application is based upon and claims the benefit of priority of the prior Japanese Patent Application No. 2013-065272, filed on Mar. 26, 2013, the entire contents of which are incorporated herein by reference.

FIELD

The embodiments discussed herein are related to a data processing apparatus and a data processing method.

BACKGROUND

A conventional technique of temporarily storing incoming data from multiple ports in a shared buffer and then transferring the data to a transfer destination for the data is known. According to the technique, parity check may be performed on a read address to determine the presence/absence of a bit error when data is read out from the shared buffer. However, when multiple bit errors occur, the occurrence of a bit error cannot be detected by parity check. To deal with this problem, a technique has been disclosed, according to which a bit error of a read address or write address that cannot be detected by parity check is detected by using a monitoring buffer, etc.

For example, when the occurrence of a bit error of a read address is confirmed, no data is read out from the shared buffer after the confirmation. When the occurrence of a bit error of a read address is confirmed, the read address having an error bit is not returned to a control unit that manages the issue of a write address to the shared buffer after the confirmation (see, e.g., Japanese Laid-Open Patent Publication No. 2008-160705).

According to another disclosed technique, overlapping of an address in use and an available address in a buffer is detected and the occurrence of an error is determined when such address overlapping is detected (see, e.g., Japanese Laid-Open Patent Publication No. H9-305493). According to still another disclosed technique, the occurrence of an error is determined when a writing process is not executed during a period in which a cyclic address for designating an available address of a buffer makes a full cycle and an address not in use is detected (see, e.g., Japanese Laid-Open Patent Publication No. 2011-234114).

However, even if an error of an address that cannot be detected by parity check is detected, returning a read address having an error bit results in overwriting of unread data stored in the shared buffer. If the unread data is overwritten in this manner, the original unread data is deleted, which results in missing data or may lead to erroneous data delivery by which incorrect data is transmitted.

If incorrect data overwriting occurs in the shared buffer, original data that has been deleted cannot be restored.

SUMMARY

According to an aspect of an embodiment, a data processing apparatus includes a shared buffer that saves data incoming from multiple ports; an address issuing unit that when the data incoming from the ports is written to the shared buffer, issues a write address for the shared buffer from among available addresses; a return address receiving unit that when the data is read out from the shared buffer, receives a returned read address for the read out data and manages the returned read address as an available address; a monitoring buffer that saves information that indicates a use status of an address for the shared buffer; and a monitoring unit that monitors issuance of the write address by the address issuing unit and reception of the returned read address by the return address receiving unit, changes contents of the information that is saved by the monitoring buffer and corresponds to the write address to be issued, from an unused state to a used state, when the write address is issued by the address issuing unit, and changes contents of the information that is saved by the monitoring buffer and corresponds to a read address to be returned, from a used state to an unused state when the returned read address is received by the return address receiving unit. The monitoring unit determines that the address for the shared buffer is overlapping, when the information that is saved by the monitoring buffer and corresponds to the write address to be issued indicates a used state when the write address is issued by the address issuing unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 depicts an example of a writing operation during which a bit error occurs at a write address Fifo.

DESCRIPTION OF EMBODIMENTS

Figure 1:
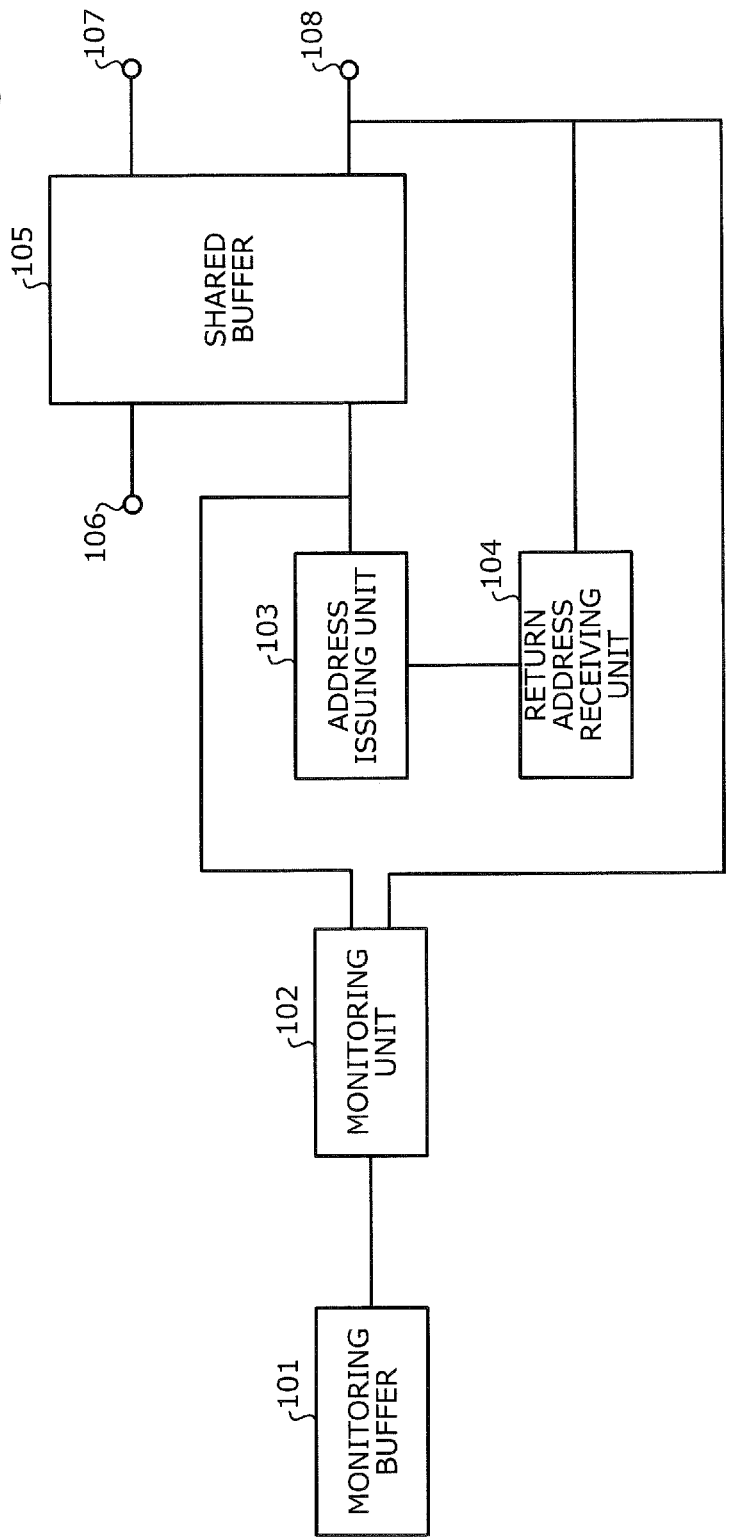
FIG. 1 depicts an example of a data processing apparatus according to an embodiment.

Embodiments of a data processing apparatus and a data processing method will be described in detail with reference to the accompanying drawings. In the description below, identical components are given the same reference numerals and redundant explanation is omitted.

Figure 2:
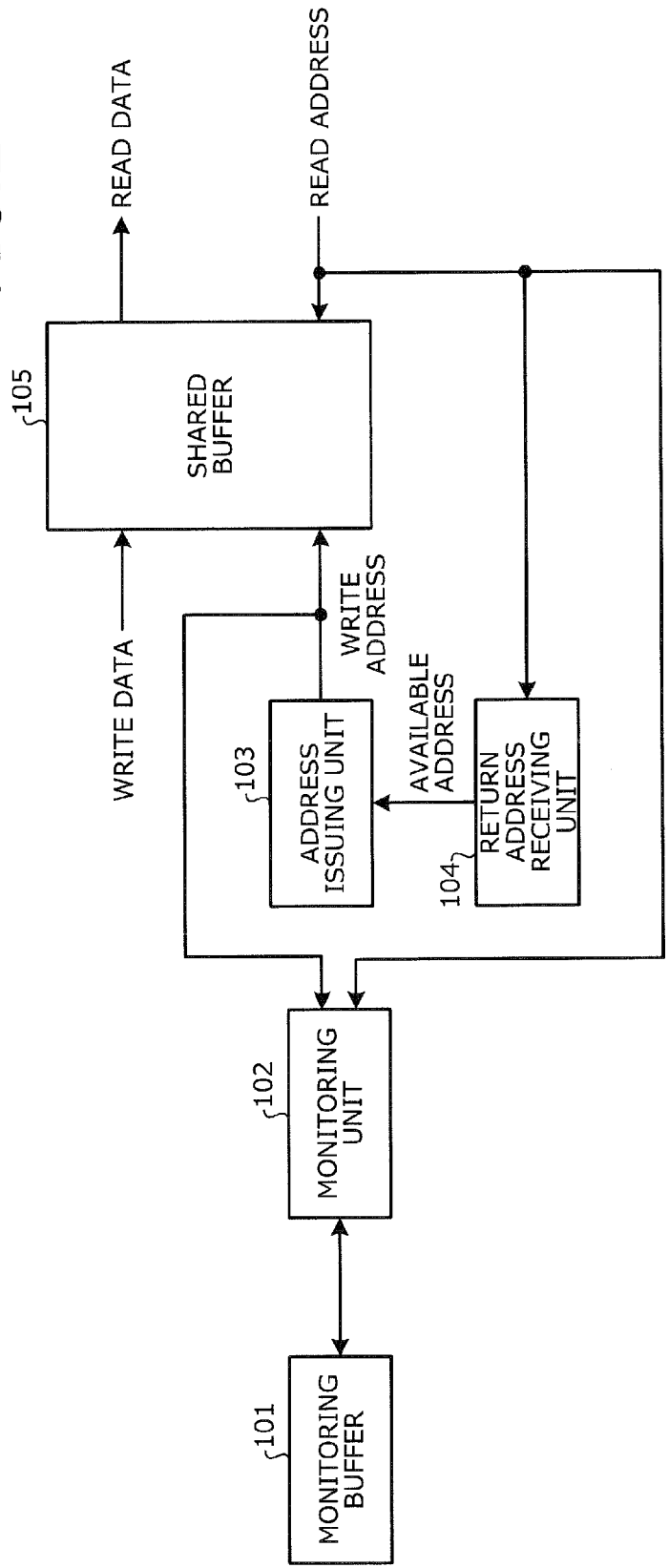
FIG. 2 depicts signal flow in the data processing apparatus of FIG. 1.

FIG. 1 depicts an example of a data processing apparatus according to an embodiment. FIG. 2 depicts signal flow in the data processing apparatus of FIG. 1. As depicted in FIGS. 1 and 2, the data processing apparatus includes a monitoring buffer 101, a monitoring unit 102, an address issuing unit 103, a return address receiving unit 104, and a shared buffer 105.

The shared buffer 105 is connected to the address issuing unit 103, a data input terminal 106, a data output terminal 107, and a read address input terminal 108. The data input terminal 106 receives input data that is to be written (hereinafter "write data") from multiple ports (not depicted). The input write data from the data input terminal 106 is written to an area of the shared buffer 105 designated by a write address issued from the address issuing unit 103. In other words, the shared buffer 105 saves the data input from the multiple ports (not depicted).

The read address input terminal 108 receives a read address for the shared buffer 105 from, for example, a queue (not depicted) and saves the read address. From the data output terminal 107, data to be read (hereinafter "read data") is output; the data is saved in an area of the shared buffer 105 that is designated by the read address input to the read address input terminal 108.

The address issuing unit 103 is connected to the return address receiving unit 104. When write data is written to the shared buffer 105, the address issuing unit 103 issues a write address for the shared buffer 105 from among available addresses. In other words, the address issuing unit 103 outputs the write address for the shared buffer 105. The address issuing unit 103 saves available addresses delivered from the return address receiving unit 104 to the address issuing unit 103.

The return address receiving unit 104 is connected to the read address input terminal 108. When data is read out from the shared buffer 105, the return address receiving unit 104 receives a returned read address for the read out data. The return address receiving unit 104 manages the received returned read address as an available address, and delivers the available address to the address issuing unit 103.

The monitoring buffer 101 is connected to the monitoring unit 102. The monitoring buffer 101 saves information that indicates the use status of addresses for the shared buffer 105. When the power supply to the data processing apparatus is turned on or the data processing apparatus is reset, the monitoring buffer 101 is set to an initial state. When the monitoring buffer 101 is in the initial state, the information indicating the use status of addresses for the shared buffer 105 indicates that all addresses are in an unused state.

The monitoring unit 102 is connected to the address issuing unit 103. The monitoring unit 102 monitors the issuance of a write address by the address issuing unit 103. When the address issuing unit 103 issues a write address, the monitoring unit 102 changes in the monitoring buffer 101, the contents of information that corresponds to the write address to be issued, from an unused state to a used state. When the address issuing unit 103 issues a write address, if the information that is saved by the monitoring buffer 101 and corresponds to a write address to be issued indicates a used state, the monitoring unit 102 determines that an address for the shared buffer 105 is overlapping.

The monitoring unit 102 is connected to the read address input terminal 108. The monitoring unit 102 monitors reception of a returned read address by the return address receiving unit 104. When the return address receiving unit 104 receives a returned read address, the monitoring unit 102 changes in the monitoring buffer 101, the contents of the information that corresponds to the read address that is returned, from a used state to an unused state. When the return address receiving unit 104 receives a returned read address, if the information that is saved by the monitoring buffer 101 and corresponds to the read address returned indicates an unused state, the monitoring unit 102 may determine that an address for the shared buffer 105 is overlapping.

In the data processing apparatus of FIG. 1, each of the monitoring buffer 101, the monitoring unit 102, the address issuing unit 103, the return address receiving unit 104, and the shared buffer 105 may be implemented by hardware. The monitoring unit 102, the address issuing unit 103, and the return address receiving unit 104 may be implemented by software-based processing. An example of a hardware configuration in a case of implementing the monitoring unit 102, the address issuing unit 103, and the return address receiving unit 104 by software-based processing will be described.

Figure 3:
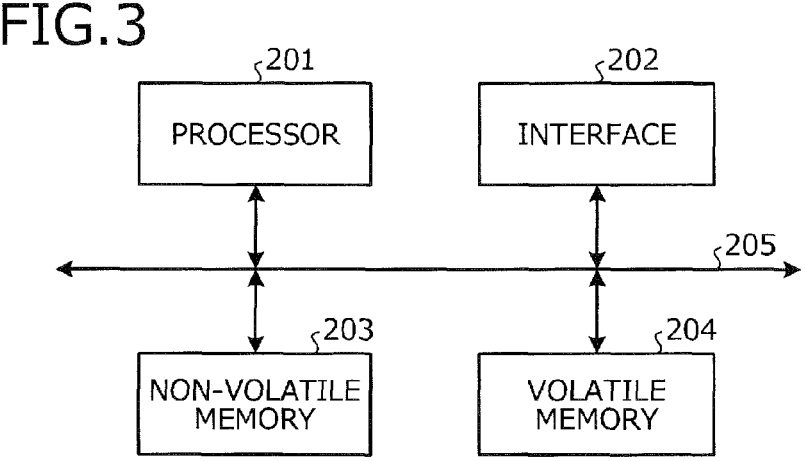
FIG. 3 depicts an example of a hardware configuration of the data processing apparatus according to the embodiment.

FIG. 3 depicts an example of a hardware configuration of the data processing apparatus according to the embodiment. As depicted in FIG. 3, the data processing apparatus includes, for example, a processor 201, an interface 202, non-volatile memory 203, and volatile memory 204. The processor 201, the interface 202, the non-volatile memory 203, and the volatile memory 204 may be connected to a bus 205.

The processor 201 runs a program that implements a data processing method, which will be described later, and thereby implements the monitoring unit 102, the address issuing unit 103, and the return address receiving unit 104 in the data processing apparatus of FIG. 1. The processor 201 is provided as, for example, a programmable logic device, such as a central processing unit (CPU), a digital signal processor (DSP), an application specific integrated circuit (ASIC), and a field programmable gate array (FPGA).

The non-volatile memory 203 stores a boot program and the program that realizes the data processing method, which will be described later. When the processor 201 is a programmable logic device, the non-volatile memory 203 may store circuit information of the programmable logic device. The non-volatile memory 203 is provided as, for example, read only memory (ROM), such as mask ROM, electrically erasable programmable read only memory (EEPROM), and flash memory.

The volatile memory 204 is used as a work area for the processor 201. The volatile memory 204 saves programs and circuit information read out from the non-volatile memory 203. The monitoring buffer 101 may be implemented by the volatile memory 204, and the shared buffer 105 may also be implemented by the volatile memory 204. The volatile memory 204 is provided as, for example, random access memory, such as dynamic random access memory (DRAM) and static random access memory (SRAM).

The interface 202 supervises the input of write data and the output of read data.

The data processing method may be performed by the data processing apparatus of FIG. 1. This embodiment will be described on the assumption that the data processing method is performed by the data processing apparatus of FIG. 1.

Figure 4:
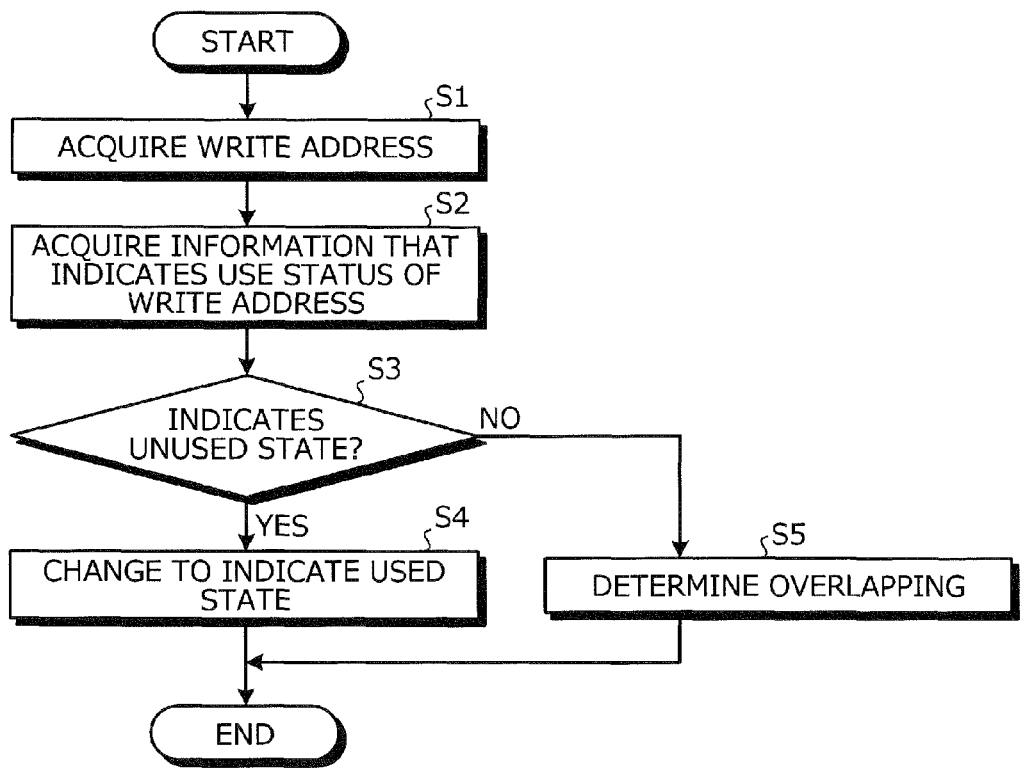
FIG. 4 depicts an example of a process of data writing by a data processing method of the embodiment.

FIG. 4 depicts an example of a process of data writing by the data processing method of the embodiment. As depicted in FIG. 4, when data input from the data input terminal 106 is written to the shared buffer 105, the address issuing unit 103 issues a write address for the shared buffer 105, from among available addresses. The monitoring unit 102 acquires the write address issued from the address issuing unit 103 (step S1).

The monitoring unit 102 then acquires from the monitoring buffer 101, information that indicates the use status of the write address acquired at step S1 (step S2). The monitoring unit 102 determines whether the information indicating the use status of the write address acquired at step S2 indicates an unused state (step S3).

If the information indicates an unused state (step S3: YES), the monitoring unit 102 changes the contents of the information to indicate a used state (step S4), and ends a series of operations of the process of data writing. If the information indicates an unused state (step S3: YES), the data input from the data input terminal 106 can be written to the area of the shared buffer 105 designated by the write address.

If the information does not indicate the unused state (step S3: NO), it means that the data has not been read yet, i.e., valid data is saved in the area of the shared buffer 105 designated by the write address acquired at step S1. The monitoring unit 102, therefore, determines that the write address is overlapping (step S5), and ends a series of operations of the process of data writing.

If it is determined that the write address is overlapping, the address issuing unit 103 may discard the write address to be issued. As a result, no data is overwritten in the area of the shared buffer 105 designated by the write address that is determined to be overlapping. This prevents overwriting of data that has not been read out from the shared buffer 105, that is, prevents missing data.

Figure 5:
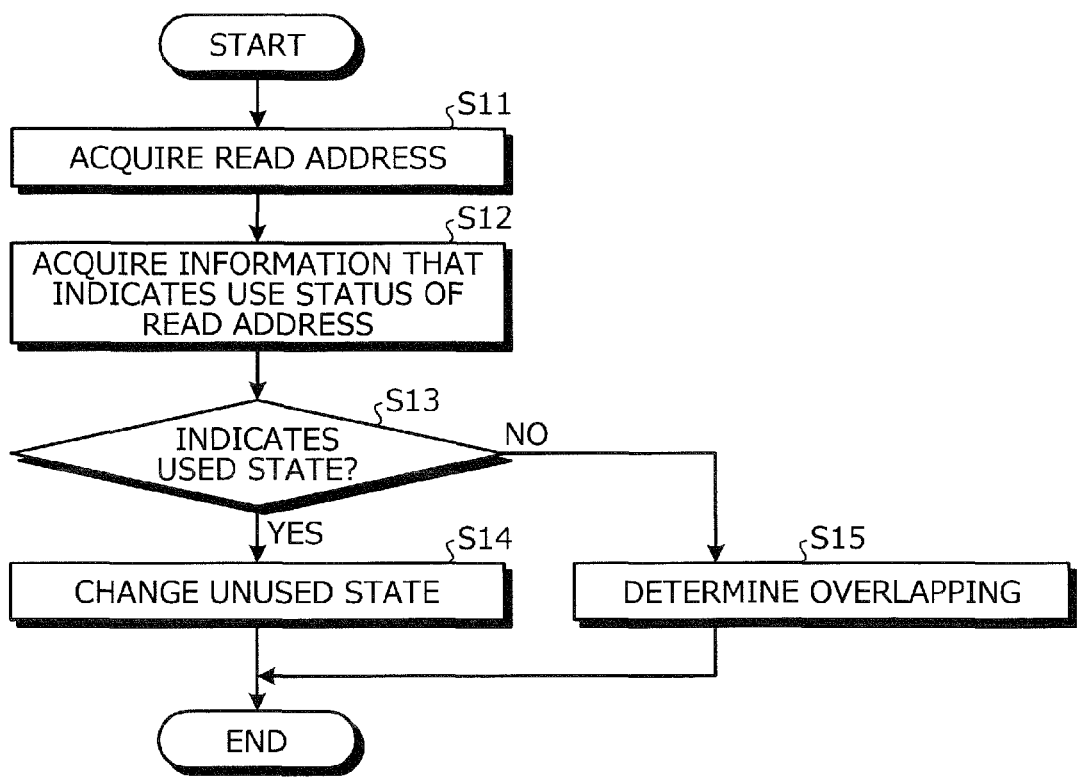
FIG. 5 depicts an example of a process of data reading by the data processing method of the embodiment.

FIG. 5 depicts an example of a process of data reading by the data processing method of the embodiment. As depicted in FIG. 5, when data saved in the area of the shared buffer 105 designated by a read address input from the read address input terminal 108 is read out, the monitoring unit 102 acquires the read address input from the read address input terminal 108 (step S11).

The monitoring unit 102 then acquires from the monitoring buffer 101, information that indicates the use status of the read address acquired at step S11 (step S12). The monitoring unit 102 determines whether the information indicates a used state (step S13).

If the information indicates a used state (step S13: YES), the monitoring unit 102 changes the contents of the information to an unused state (step S14), and ends a series of operations of the process of data reading. If the information indicates the used state (step S13: YES), the data can be read out from the area of the shared buffer 105 designated by the read address and output to the data output terminal 107.

If the information does not indicate a used state (step S13: NO), it means that the data has not been read, i.e., valid data is not saved in the area of the shared buffer 105 designated by the read address.

The monitoring unit 102, therefore, determines that the read address is overlapping (step S15), and ends a series of operations of the process of data reading. If it is determined that the read address is overlapping, the return address receiving unit 104 has no need to receive the returned read address determined to be overlapping. This prevents a continuation of the overlapping state of the address for the shared buffer 105.

If it is determined that the read address is overlapping, the monitoring unit 102 may discard data read out from the area of the shared buffer 105 designated by the read address determined to be overlapping. This prevents the data from being transferred based on information of a destination that is different from the original destination for the data, that is, prevents delivery of data to an incorrect destination.

According to the data processing apparatus of FIG. 1 or the data processing method of FIGS. 4 to 5, whether a write address is overlapping is determined when data is written to the shared buffer 105, and if the write address is overlapping, the write address is discarded. This prevents missing data. Whether a read address is overlapping is determined when data is read out from the shared buffer 105, and if the read address is overlapping, the returned read address is not received. This prevents the continuation of the overlapping state of the address. If a read address is overlapping when data is read out from the shared buffer 105, the data read out from the shared buffer 105 is discarded. This prevents delivery of the data to an incorrect destination.

The data processing apparatus of FIG. 1 is applicable to a switch card that performs a data transfer process in a layer 2 switch or a layer 3 switch. For example, a case of applying the data processing apparatus of FIG. 1 to a switch card in a layer 2 switch will be described.

Figure 6:
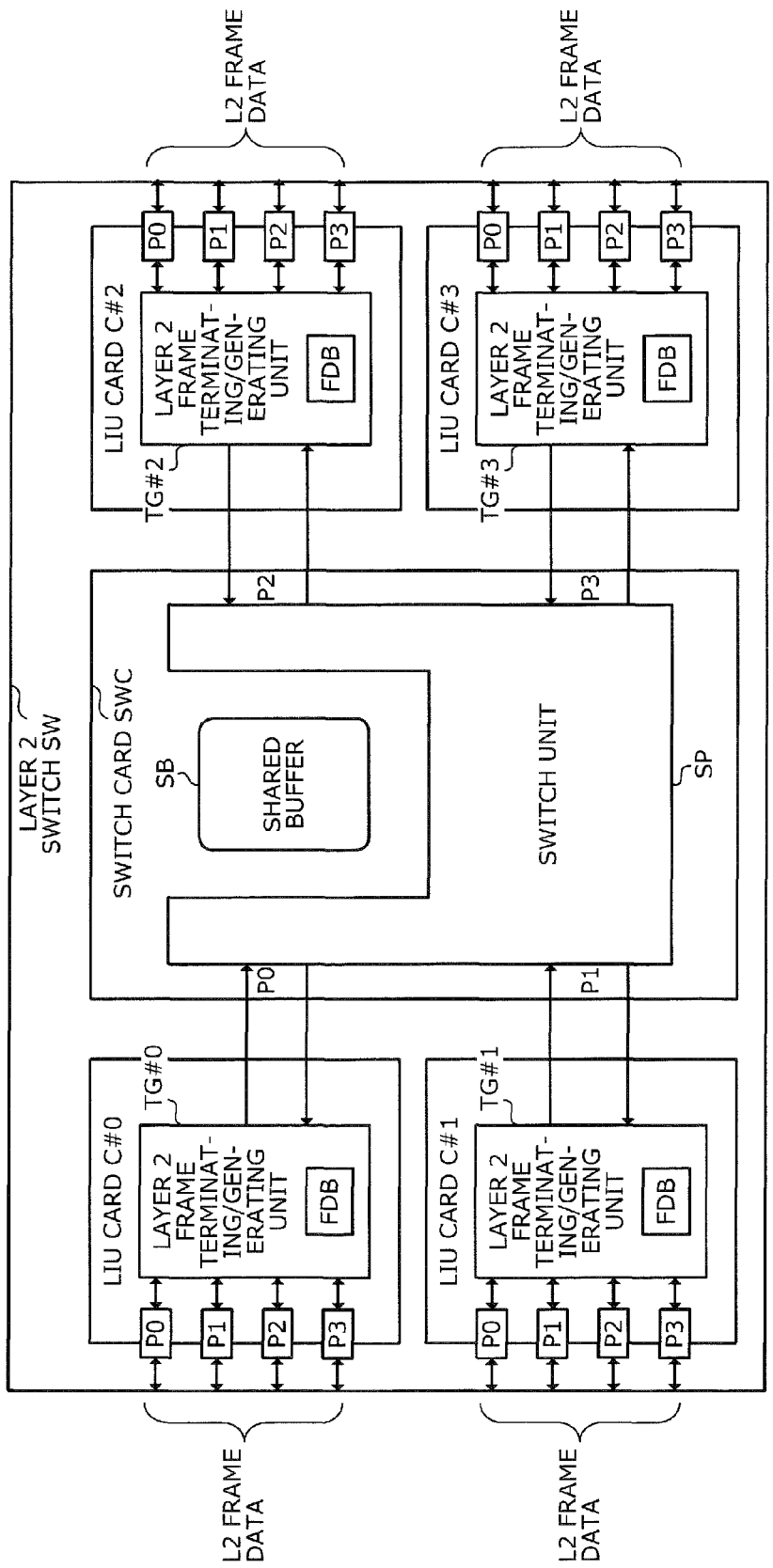
FIG. 6 depicts an example of a layer 2 switch.

FIG. 6 depicts an example of a layer 2 switch. As depicted in FIG. 6, the layer 2 switch SW includes multiple, e.g., four line interface unit cards C#0 to C#3 and a switch card SWC. Each of the line interface unit cards C#0 to C#3 and the switch card SWC may be composed of an independent printed board unit. Each printed board unit may be interconnected via wires on a substrate, such as a backboard. In the following description, the line interface unit cards may be referred to as LIU cards, the number of which may be three or less or five or more.

The LIU cards C#0 to C#3 output to the switch card SWC, incoming layer 2 frame data from transmission paths. The LIU cards C#0 to C#3 also output to the transmission paths, incoming layer 2 frame data from the switch card SWC. For example, each of the LIU cards C#0 to C#3 has four ports P0 to P3. The ports P0 to P3 may be connected to, for example, the transmission paths (not depicted). Each of the LIU cards C#0 to C#3 may have three or fewer ports or five or more ports.

The LIU cards C#0 to C#3 have layer 2 frame terminating/generating units TG#0 to TG#3, respectively. The layer 2 frame terminating/generating units TG#0 to TG#3 are connected to the ports P0 to P3 of the LIU cards C#0 to C#3. Each of the layer 2 frame terminating/generating units TG#0 to TG#3 receives incoming layer 2 frame data from the ports P0 to P3 of the LIU cards C#0 to C#3, adds transfer destination card information and port information to the layer 2 frame data, and outputs the layer 2 frame data to the switch card SWC.

Each of the layer 2 frame terminating/generating units TG#0 to TG#3 has a forwarding database FDB, which stores correspondence relations between a destination address and the transfer destination card information and port information in the incoming layer 2 frame data from the ports P0 to P3 of each of the LIU cards C#0 to C#3. Each of the layer 2 frame terminating/generating units TG#0 to TG#3 searches the forwarding database FDB thereof using the destination address in the layer 2 frame data and thereby, acquires the transfer destination card information and port information.

In some cases, the destination address in the layer 2 frame data is not registered in the forwarding database FDB. In such a case, the layer 2 frame terminating/generating units TG#0 to TG#3 add card information and port information to the layer 2 frame data so that the layer 2 frame data is transferred to each LIU card C#0 to C#3 (data flooding). In this manner, as information providing an interface between the LIU cards C#0 to C#3 and the switch card SWC, the card information and port information is added to the layer 2 frame data for the purpose of data transfer inside the switch.

The layer 2 frame terminating/generating units TG#0 to TG#3 delete the transfer destination card information and port information from incoming layer 2 frame data from the switch card SWC, and output the layer 2 frame data to the port P0 to P3 that corresponds to the transfer destination port information in each of the LIU cards C#0 to C#3.

The switch card SWC outputs incoming layer 2 frame data from each of the LIU cards C#0 to C#3, to the LIU card C#0 to C#3 that corresponds to the transfer destination card information. The switch card SWC has a shared buffer SB and a switch unit SP. The shared buffer SB saves layer 2 frame data input from the LIU cards C#0 to C#3 to the switch unit SP. The shared buffer SB has multiple pages in which layer 2 frame data is stored. To a page from which layer 2 frame data has been read just before, another layer 2 frame data is newly written as the latest data. Thus, the pages are used one by one.

The switch unit SP has ports of a number equivalent to the number of the LIU cards. In the example of FIG. 6, the switch card SWC has, for example, four ports P0 to P3. The ports P0 to P3 of the switch unit SP are connected to the LIU cards C#0 to C#3, respectively. The switch unit SP may have three or fewer ports or five or more ports.

The switch unit SP receives layer 2 frame data carrying transfer destination card information and port information, from the ports P0 to P3 of the switch unit SP. Based on the transfer destination card information added to the layer 2 frame data, the switch unit SP changes the transfer destination for the layer 2 frame data to the LIU card C#0 to C#3 that corresponds to the transfer destination card information. The switch unit SP then reads the layer 2 frame data out from the shared buffer SB and outputs the layer 2 frame data to the LIU card C#0 to C#3 that corresponds to the transfer destination card information.

In the layer 2 switch SW of FIG. 6, layer 2 frame data is transferred to an intended transfer destination in the following manner. Layer 2 frame data input to the ports P0 to P3 of each of the LIU cards C#0 to C#3 is transferred to each of the layer 2 frame terminating/generating units TG#0 to TG#3, which add transfer destination card information and port information to the layer 2 frame data, and is transferred to the switch card SWC. The layer 2 frame data input to the switch card SWC is temporarily saved in the shared buffer SB, and is read out from the shared buffer SB by the switch unit SP, and then is transferred to the LIU card C#0 to C#3 that corresponds to the transfer destination card information.

Layer 2 frame data input from the switch card SWC to the LIU cards C#0 to C#3 is output by the layer 2 frame terminating/generating units TG#0 to TG#3 from the port P0 to P3 that corresponds to the transfer destination port information. At this time, each of the layer 2 frame terminating/generating units TG#0 to TG#3 delete the transfer destination card information and port information from the layer 2 frame data.

Figure 7:
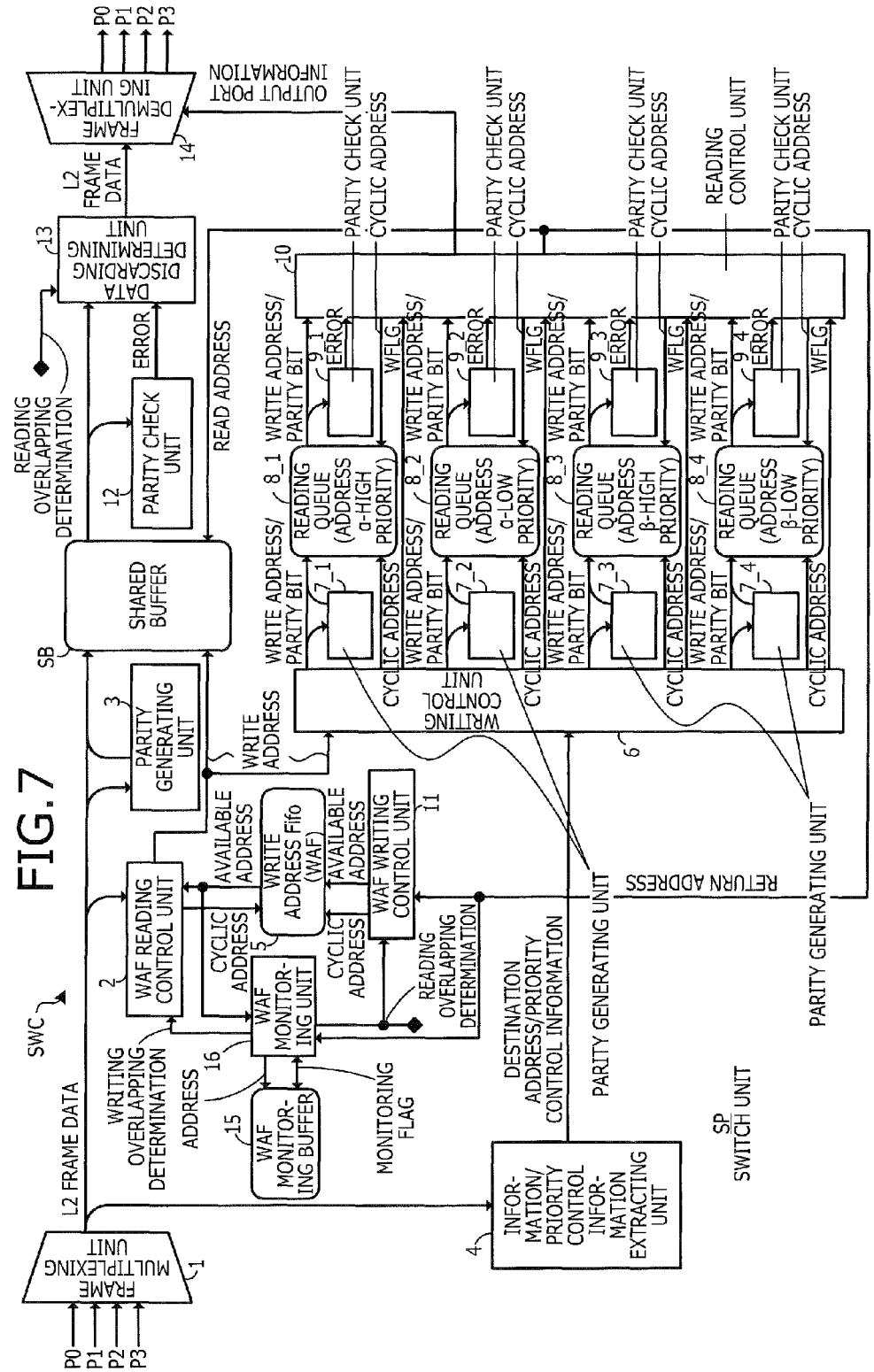
FIG. 7 depicts an example of a switch card of the embodiment.

FIG. 7 depicts an example of the switch card of the embodiment. As depicted in FIG. 7, in the switch card SWC, the switch unit SP includes a frame multiplexing unit 1, a write address Fifo (WAF) 5, a WAF reading control unit 2, a WAF writing control unit 11, a WAF monitoring buffer 15, and a WAF monitoring unit 16.

The write address Fifo 5 is connected to the WAF reading control unit 2 and the WAF writing control unit 11. The write address Fifo 5 stores therein an address corresponding to a free space of the shared buffer SB. In the following description, an address corresponding to a free space of the shared buffer SB may be referred to as an available address.

From a write address Fifo 5 memory area that corresponds to a cyclic address designated by the WAF reading control unit 2, the write address Fifo 5 issues an available address of the shared buffer SB to the WAF reading control unit 2. The write address Fifo 5 stores to the write address Fifo 5 memory area that corresponds to the cyclic address designated by the WAF writing control unit 11, an available address that is of the shared buffer SB and given by the WAF writing control unit 11.

The frame multiplexing unit 1 is connected to each of the ports P0 to P3 of the switch unit SP of FIG. 6. The frame multiplexing unit 1 multiplexes layer 2 frame data incoming from each of the ports P0 to P3 of the switch unit SP of FIG. 6.

The WAF reading control unit 2 is connected to the frame multiplexing unit 1, the WAF monitoring unit 16, and the shared buffer SB. When receiving layer 2 frame data from the frame multiplexing unit 1, the WAF reading control unit 2 designates a cyclic address for the write address Fifo 5. A case is assumed where the address range of the write address Fifo 5 includes, for example, values "0" to "1023". In this case, the WAF reading control unit 2 designates the cyclic address for the write address Fifo 5 by starting with the first value "0" and designating "1", "2", and so on in increasing order. When reaching the last value "1023", the WAF reading control unit returns to the first value "0" to restart address designation in increasing order.

The WAF reading control unit 2 acquires from the write address Fifo 5, an available address of the shared buffer SB that corresponds to a cyclic address designated by the WAF reading control unit 2. When receiving from the WAF monitoring unit 16, a writing overlapping determination message indicating no overlapping, the WAF reading control unit 2 issues the available address acquired from the write address Fifo 5, as a write address for the shared buffer SB.

When receiving from the WAF monitoring unit 16, a writing overlapping determination message indicating overlapping, the WAF reading control unit 2 discards the available address acquired from the write address Fifo 5. The WAF reading control unit 2 and the write address Fifo 5 are an example of the address issuing unit.

The WAF writing control unit 11 is connected to a reading control unit 10, which will be described later, and the WAF monitoring unit 16. The WAF writing control unit 11 designates a cyclic address for the write address Fifo 5 in the same manner as the WAF reading control unit 2 does.

From the reading control unit 10, the WAF writing control unit 11 acquires a read address that is used when layer 2 frame data is read out from the shared buffer SB, as a return address. When receiving from the WAF monitoring unit 16, a reading overlapping determination message indicating no overlapping, the WAF writing control unit 11 stores, as an available address of the shared buffer SB, the return address acquired from the reading control unit 10 to a memory area that is of the write address Fifo 5 and corresponds to the cyclic address designated by the WAF writing control unit 11.

When receiving from the WAF monitoring unit 16, a reading overlapping determination message indicating overlapping, the WAF writing control unit 11 discards the available address acquired from the reading control unit 10. The WAF writing control unit 11 is an example of the return address receiving unit.

The WAF monitoring buffer 15 is connected to the WAF monitoring unit 16. The WAF monitoring buffer 15 saves information that indicates the use status of addresses for the shared buffer SB. The information that indicates the use status of addresses for the shared buffer SB may be a flag which is, for example, set to "0" when an address is in an unused state and to "1" when the address is in a used state. In the following description, the information that indicates the use status of addresses is described as a flag, which may be referred to as monitoring flag.

The value of an address of the WAF monitoring buffer 15 is identical to the value of an address of the shared buffer SB. For example, when the value of a monitoring flag saved in a memory area corresponding to an address of "0" of the WAF monitoring buffer 15 is "1", an address of "0" of the shared buffer SB is in a used state and therefore, is not an available address. This means that valid layer 2 frame data is stored in the memory area corresponding to the address of "0" of the shared buffer SB.

In contrast, for example, when the value of the monitoring flag saved in a memory area corresponding to an address of "1" of the WAF monitoring buffer 15 is "0", an address of "1" of the shared buffer SB is in an unused state and therefore, is an available address. This means that valid layer 2 frame data is not stored in the memory area corresponding to the address of "1" of the shared buffer SB. The WAF monitoring buffer 15 is an example of the monitoring buffer.

The WAF monitoring unit 16 is connected to the write address Fifo 5, the WAF monitoring buffer 15, and the reading control unit 10, which will be described later. The WAF monitoring unit 16 acquires an available address of the shared buffer SB issued from the write address Fifo 5 to the WAF reading control unit 2, and reads the value of the monitoring flag out from the WAF monitoring buffer 15 memory area that corresponds to the address identical in value to the acquired available address.

When the value of the monitoring flag read out from the WAF monitoring buffer 15 is "0", the monitoring flag indicates that the available address issued from the write address Fifo 5 to the WAF reading control unit 2 is in an unused state. Thus, the WAF monitoring unit 16 determines that the address of the shared buffer SB is not overlapping.

When making a determination of no overlapping, the WAF monitoring unit 16 changes the value of the monitoring flag saved in the WAF monitoring buffer 15 memory area that corresponds to the address identical in value to the available address issued from the write address Fifo 5, to "1". As a result, the address of the shared buffer SB issued from the write address Fifo 5 as the available address is shifted from an unused state, i.e., available address, to a used state. The WAF monitoring unit 16 sends to the WAF reading control unit 2, a writing overlapping determination message that indicates no overlapping.

When the value of the monitoring flag read out from the WAF monitoring buffer 15 is "1", the monitoring flag indicates that the available address issued from the write address Fifo 5 to the WAF reading control unit 2 is in a used state. Thus, the WAF monitoring unit 16 determines that the address of the shared buffer SB is overlapping.

When making a determination of overlapping, the WAF monitoring unit 16 does not change the value of the monitoring flag saved in the WAF monitoring buffer 15 memory area that corresponds to the address identical in value to the available address issued from the write address Fifo 5 and leaves the original value "1" as is. As a result, the address of the shared buffer SB issued from the write address Fifo 5 as the available address remains in a used state. The WAF monitoring unit 16 sends to the WAF reading control unit 2, a writing overlapping determination message that indicates overlapping.

The WAF monitoring unit 16 acquires a return address from the reading control unit 10, and reads the value of a monitoring flag out from the WAF monitoring buffer 15 memory area that corresponds to the address identical in value to the return address.

When the value of the monitoring flag read out from the WAF monitoring buffer 15 is "1", the monitoring flag indicates that the return address is in a used state. This means that readable layer 2 frame data is stored in the shared buffer SB memory area that corresponds to the return address. Thus, the WAF monitoring unit 16 determines that the read address is used when readable layer 2 frame data is read out from the shared buffer SB, i.e., the return address is not overlapping.

When making a determination of no overlapping, the WAF monitoring unit 16 changes the value of the monitoring flag saved in the WAF monitoring buffer 15 memory area that corresponds to the address identical in value to the return address, to "0". As a result, the shared buffer SB address that corresponds to the return address is shifted to an available address, i.e., an unused state. The WAF monitoring unit 16 sends a reading overlapping determination message that indicates no overlapping to the WAF writing control unit 11 and a data discarding determining unit 13, which will be described later.

When the value of the monitoring flag read out from the WAF monitoring buffer 15 is "0", the monitoring flag indicates that the return address is in an unused state. This means that layer 2 frame data has never been written to the memory area that is of the shared buffer SB and corresponds to the return address, or that the return address has already been returned. Thus, the WAF monitoring unit 16 determines that the return address is overlapping.

When making a determination of overlapping, the WAF monitoring unit 16 does not change the value of the monitoring flag saved in the WAF monitoring buffer 15 memory area that corresponds to the address identical in value to the return address and leaves the original value "0" as is. As a result, the shared buffer SB address that corresponds to the return address remains in an unused state. The WAF monitoring unit 16 sends a reading overlapping determination message that indicates overlapping to the WAF writing control unit 11 and a data discarding determining unit 13, which will be described later. The WAF monitoring unit 16 is an example of the monitoring unit.

The switch unit SP has a parity generating unit 3, a parity check unit 12, a data discarding determining unit 13, and a frame demultiplexing unit 14. The parity generating unit 3 is connected to the frame multiplexing unit 1. The parity generating unit 3 performs error detecting parity calculation on layer 2 frame data output from the frame multiplexing unit 1, and outputs to the shared buffer SB, a parity bit resulting from the calculation.

The shared buffer SB is connected to the frame multiplexing unit 1, the parity generating unit 3, the WAF reading control unit 2, and the reading control unit 10, which will be described later. The shared buffer SB stores layer 2 frame data output from the frame multiplexing unit 1 and a parity bit output from the parity generating unit, in a memory area that corresponds to a write address issued from the WAF reading control unit 2. When given a read address by the reading control unit 10, the shared buffer SB outputs layer 2 frame data and a parity bit from the memory area that corresponds to the read address.

The parity check unit 12 is connected to the shared buffer SB. The parity check unit 12 performs parity calculation on layer 2 frame data output from the shared buffer SB, and compares a parity bit value resulting from the calculation with a parity bit value output from the parity generating unit 3. When the comparison indicates that both parity values match, the parity check unit 12 gives to the data discarding determining unit 13, notification of the absence of an error. When the parity values do not match, the parity check unit 12 gives notification of the presence of an error.

The data discarding determining unit 13 is connected to the shared buffer SB, the parity check unit 12, and the WAF monitoring unit 16. When receiving notification of the absence of an error from the parity check unit 12 and a reading overlapping determination message indicating no overlapping from the WAF monitoring unit 16, the data discarding determining unit 13 outputs to the frame demultiplexing unit 14, layer 2 frame data output from the shared buffer SB. When receiving notification of the presence of an error from the parity check unit 12 or a reading overlapping determination message indicating overlapping from the WAF monitoring unit 16, the data discarding determining unit 13 discards layer 2 frame data read out from the shared buffer SB.

The frame demultiplexing unit 14 is connected to the data discarding determining unit 13 and the reading control unit 10, which will be described later. The frame demultiplexing unit 14 receives layer 2 frame data from the data discarding determining unit 13 and output port information from the reading control unit 10. The frame demultiplexing unit 14 demultiplexes the layer 2 frame data multiplexed by the frame multiplexing unit 1, and outputs the layer 2 frame data from individual ports P0 to P3 designated by the output port information.

The switch unit SP has an address information/priority control information extracting unit 4, a writing control unit 6, parity generating units 7_1 to 7_4, reading queues 8_1 to 8_4, parity check units 9_1 to 9_4, and the reading control unit 10. In FIG. 7, four reading queues 8_1 to 8_4 are indicated. For example, the address α-high priority reading queue 8_1 and the address α-low priority reading queue 8_2 correspond to the LIU card C#1, and the address β-high priority reading queue 8_3 and the address β-low priority reading queue 8_4 correspond to the LIU card C#2. When four LIU cards C#0 to C#3 are present, as in the example of FIG. 6, therefore, eight reading queues are present. In FIG. 7, however, only four reading queues are indicated for convenience.

The address information/priority control information extracting unit 4 is connected to the frame multiplexing unit 1. The address information/priority control information extracting unit 4 extracts from the layer 2 frame data, address information and priority control information added to layer 2 frame data output from the frame multiplexing unit 1 and transfers the address information and priority control information to the writing control unit 6.

The writing control unit 6 is connected to the WAF reading control unit 2, the address information/priority control information extracting unit 4, and the reading control unit 10. The writing control unit 6 transfers a write address for the shared buffer SB and issued from the WAF reading control unit 2, together with a cyclic address for the reading queues 8_1 to 8_4, to the reading queue 8_1 to 8_4 that corresponds to address information and priority control information that the writing control unit 6 receives from the address information/priority control information extracting unit 4. The writing control unit 6 transfers a write flag WFLG for a transfer destination reading queue among the reading queues 8_1 to 8_4, to the reading control unit 10.

The parity generating units 7_1 to 7_4 are connected to the writing control unit 6. The parity generating units 7_1 to 7_4 perform error detecting parity calculation on a write address output from the writing control unit 6 and output a parity bit resulting from the calculation to the corresponding reading queues 8_1 to 8_4, respectively.

The reading queues 8_1 to 8_4 are connected to the writing control unit 6, the parity generating units 7_1 to 7_4, and the reading control unit 10. Each of the reading queues 8_1 to 8_4 stores a write address output from the writing control unit 6, together with a parity bit output from the corresponding parity generating unit 7_1 to 7_4, to the memory area that corresponds to the cyclic address output from the writing control unit 6. When given a cyclic address by the reading control unit 10, the reading queues 8_1 to 8_4 output a write address and a parity bit from the memory area that corresponds to the cyclic address.

The parity check units 9_1 to 9_4 are connected to a corresponding reading queue 8_1 to 8_4 and the reading control unit 10. The parity check units 9_1 to 9_4 performs parity calculation on a write address output from the corresponding reading queue 8_1 to 8_4, and compares a parity bit value resulting from the calculation with a parity bit value output from the corresponding parity generating unit 7_1 to 7_4. When the comparison indicates that the parity values match, the parity check units 9_1 to 9_4 give notification of the absence of an error to the reading control unit 10. When the parity values do not match, the parity check units 9_1 to 9_4 give notification of the presence of an error.

The reading control unit 10 has a volume counter (not depicted) for each of the reading queues 8_1 to 8_4. Each time the reading control unit 10 receives a write flag WFLG from the writing control unit 6, the reading control unit 10 increments the value of the corresponding volume counter. The reading control unit 10 monitors the volume of a write address stored in each of the reading queues 8_1 to 8_4 using each volume counter. When layer 2 frame data is read out from the shared buffer SB, the reading control unit 10 determines whether layer 2 frame data is accumulated in the shared buffer SB, based on the values registered by the volume counters.

When the value registered by a volume counter is not 0, the reading control unit 10 performs priority control over the reading queues 8_1 to 8_4 and parity control, such as round robin, and designates a cyclic address for one of the reading queues 8_1 to 8_4 selected as a result of the performed control to read a write address out of the selected reading queue. When a message indicating the presence of an error in a write address read out from the selected reading queue 8_1 to 8_4 is sent from the corresponding parity check unit 9_1 to 9_4, the reading control unit 10 discards the write address, that is, does not transfer the write address to the shared buffer SB. In this case, no read address is given to the shared buffer SB, and therefore, no layer 2 frame data is read out from the shared buffer SB.

When receiving a message of the absence of an error from the parity check units 9_1 to 9_4, the reading control unit 10 transfers a write address read out from the reading queues 8_1 to 8_4 to the shared buffer SB, as a read address for the shared buffer SB, and to the WAF writing control unit 11, as a return address. The reading control unit 10 transfers information of the selected reading queue 8_1 to 8_4 to the frame demultiplexing unit 14, as output port information. For example, when the address α corresponds to the LIU card C#1, information P1 that indicates the port P1 of the switch unit SP that corresponds to output to the LIU card C#1 is transferred to the frame demultiplexing unit 14.

In the switch unit SP of FIG. 7, each of the WAF monitoring buffer 15, the WAF monitoring unit 16, the WAF reading control unit 2, the WAF writing control unit 11, the writing address Fifo 5, and the shared buffer 105 may be implemented by hardware. The WAF monitoring unit 16, the WAF reading control unit 2, and the WAF writing control unit 11 may be implemented by software-based processing. A hardware configuration in a case of implementing the WAF monitoring unit 16, the WAF reading control unit 2, and the WAF writing control unit 11 by software-based processing, for example, may be the same as the hardware configuration depicted in FIG. 3. The WAF monitoring buffer 15, the shared buffer SB, or the writing address Fifo 5, for example, may be implemented by volatile memory, such as RAM.

Each of the frame multiplexing unit 1, the parity generating unit 3, the parity check unit 12, the data discarding determining unit 13, and the frame demultiplexing unit 14 may be implemented by hardware. Each of the address information/priority control information extracting unit 4, the writing control unit 6, the parity generating units 7_1 to 7_4, the reading queues 8_1 to 8_4, the parity check units 9_1 to 9_4, and the reading control unit 10 may be implemented by hardware.

The frame multiplexing unit 1, the parity generating unit 3, the parity check unit 12, the data discarding determining unit 13, the frame demultiplexing unit 14, the address information/priority control information extracting unit 4, the writing control unit 6, the parity generating units 7_1 to 7_4, the parity check units 9_1 to 9_4, and the reading control unit 10 may be implemented by software-based processing. A hardware configuration in a case of implementing the frame multiplexing unit 1, the parity generating unit 3, the information/priority control information extracting unit 4, the writing control unit 6, the parity generating units 7_1 to 7_4, the parity check units 9_1 to 9_4, the reading control unit 10, the parity check unit 12, the data discarding determining unit 13, and the frame demultiplexing unit 14 by software-based processing, for example, may be the same as the hardware configuration depicted in FIG. 3. The reading queues 8_1 to 8_4 may be implemented by volatile memory, such as RAM.

Figure 8:
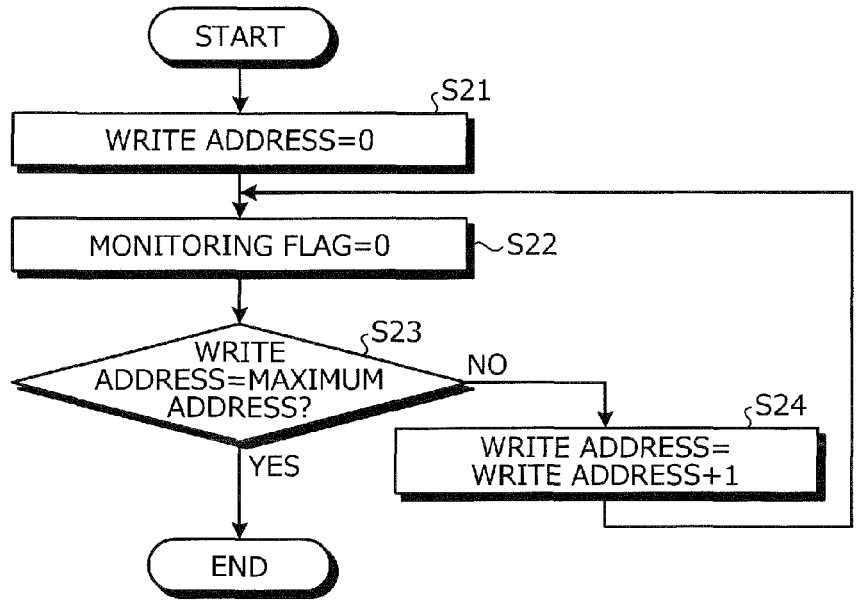
FIG. 8 depicts an example of an initialization operation for initializing a WAF monitoring buffer.

FIG. 8 depicts an example of an initialization operation for initializing the WAF monitoring buffer. When the power supply to the switch card SWC or an apparatus having the switch card SWC and LIU cards C#0 to C#3 is turned on or the apparatus is started by being released from the reset state, initialization of the WAF monitoring buffer 15 is started.

As depicted in FIG. 8, at the start of initialization of the WAF monitoring buffer 15, the WAF monitoring unit 16 sets a write address for writing data to the WAF monitoring buffer 15, to 0 (step S21). The WAF monitoring unit 16 then writes "0" as the value of the monitoring flag, to a memory area that is of the WAF monitoring buffer 15 and corresponds to the write address (step S22).

The WAF monitoring unit 16 determines whether the current write address for the WAF monitoring buffer 15 is the maximum address among addresses for the WAF monitoring buffer 15 (step S23). When the current write address for the WAF monitoring buffer 15 is not the maximum address among addresses for the WAF monitoring buffer 15 (step S23: NO), the WAF monitoring unit 16 adds 1 to the current write address for the WAF monitoring buffer 15 to create a new current address. In other words, the write address for the WAF monitoring buffer 15 is increased by 1 (step S24).

The WAF monitoring unit 16 returns to step S22, and the WAF monitoring unit 16 repeats the process of setting the value of a monitoring flag to "0" until the current address reaches the maximum address for the WAF monitoring buffer 15. When the current address for the WAF monitoring buffer 15 reaches the maximum address for the WAF monitoring buffer 15 (step S23: YES), the values of all monitoring flags stored in the monitoring buffer 15 are set to "0". Thus, a series of steps of the initialization operation is ended. The values of all monitoring flags being "0" means an address space in the shared buffer SB is unused.

Figure 9:
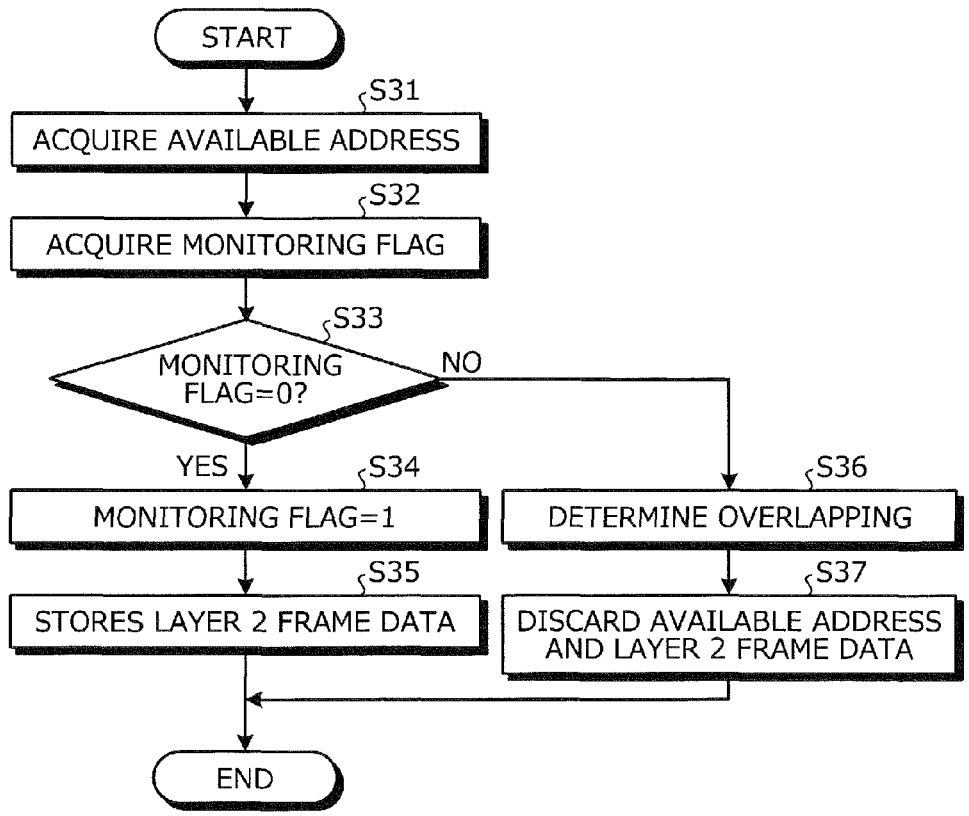
FIG. 9 depicts an example of a data writing operation of writing data to a shared buffer.

FIG. 9 depicts an example of a data writing operation of writing data to the shared buffer. When the switch card SWC receives layer 2 frame data, the data writing operation of writing data to the shared buffer is started.

As depicted in FIG. 9, at the start of the data writing operation of writing data to the shared buffer, the WAF reading control unit 2 designates a cyclic address for the write address Fifo 5. The WAF reading control unit 2 then acquires an available address (Add1) saved in a memory area that is of the write address Fifo 5 and corresponds to the cyclic address (step S31).

The WAF monitoring unit 16 also acquires the available address Add1. The WAF monitoring unit 16 designates the available address Add1 for the WAF monitoring buffer 15. The WAF monitoring unit 16 then acquires a monitoring flag (FL1) stored in a memory area that is of the WAF monitoring buffer 15 and corresponds to the available address Add1 (step S32).

Subsequently, the WAF monitoring unit 16 determines whether the monitoring flag FL1 is "0" (step S33). If the monitoring flag FL1 is "0" (step S33: YES), the WAF monitoring unit 16 determines that the available address is in an unused state and is therefore not used in an overlapping manner. The WAF monitoring unit 16 thus sends a writing overlapping determination message that indicates no overlapping to the WAF reading control unit 2.

The WAF monitoring unit 16 then writes "1" to the memory area that is of the WAF monitoring buffer 15 and corresponds to the available address Add1 and thereby, changes the value of the monitoring flag FL1 corresponding to the available address Add1 to "1" (step S34). This indicates that the memory area that is of the shared buffer SB and corresponds to the available address Add1 is in a used state.

Subsequently, the reading control unit 2 transfers the available address Add1 to the shared buffer SB. As a result, the shared buffer SB stores layer 2 frame data in the memory area thereof corresponding to the available address Add1 (step S35), at which a series of steps of the data writing operation is ended.

At step S33, if the monitoring flag FL1 is not "0", that is, the monitoring flag FL1 is "1" (step S33: NO), the WAF monitoring unit 16 determines that the available address Add1 is in a used state and is, therefore, used in an overlapping manner. The WAF monitoring unit 16 thus sends a writing overlapping determination message that indicates overlapping to the WAF reading control unit 2 (step S36).

The WAF reading control unit 2 then discards the available address Add1. As a result, layer 2 frame data is not stored in the shared buffer SB and is discarded (step S37), at which a series of steps of the data writing operation is ended.

Figure 10:
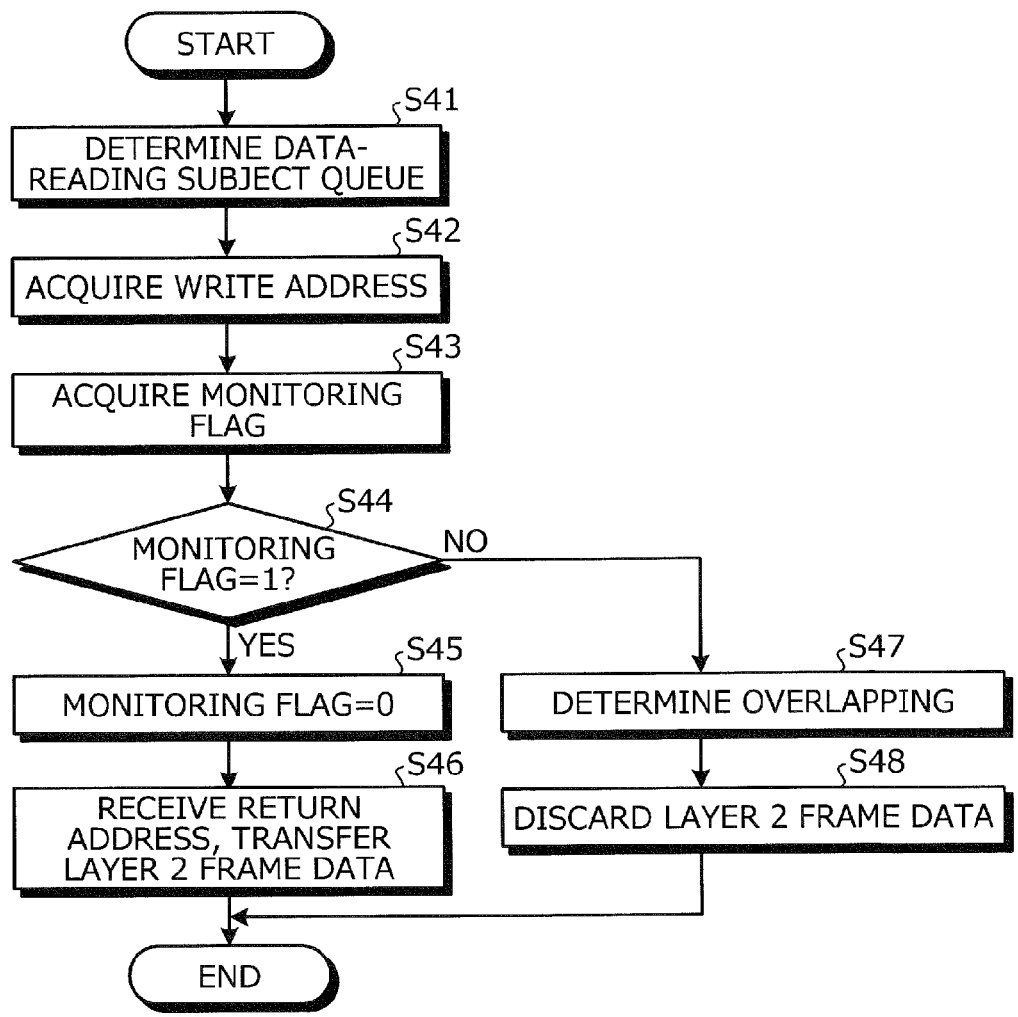
FIG. 10 depicts an example of a data reading operation of reading data out from the shared buffer.

FIG. 10 depicts an example of a data reading operation of reading data out from the shared buffer. As depicted in FIG. 10, at the start of the data reading operation of reading data out from the shared buffer, by performing priority control and parity control, the reading control unit 10 determines a data-reading subject queue from which data is to be read, from among the reading queues 8_1 to 8_4 (step S41).

The reading control unit 10 then designates a cyclic address for the data-reading subject queue from among the reading queues 8_1 to 8_4, and acquires a write address (Add2) saved in a memory area of the data-reading subject queue that corresponds to the cyclic address (step S42). When receiving a message indicating the presence of an error in the write address Add2 from the corresponding parity check units 9_1 to 9_4, the reading control unit 10 discards the write address Add2.

When receiving a message indicating the absence of an error, the reading control unit 10 transfers the write address Add2 to the shared buffer SB, as a read address for the shared buffer SB (which is the same as the write address Add2 and is, therefore, expressed as read address Add2). As a result, layer 2 frame data is read out from a memory area that is of the shared buffer SB and corresponds to the read address Add2.

The WAF monitoring unit 16 and the WAF writing control unit 11 acquire the read address Add2 as a return address (which is the same as the read address Add2 and is, therefore, expressed as return address Add2). The WAF monitoring unit 16 designates the return address Add2 for the WAF monitoring buffer 15. The WAF monitoring unit 16 then acquires a monitoring flag (FL2) stored in a memory area that is of the WAF monitoring buffer 15 and corresponds to the return address Add2 (step S43).

Subsequently, the WAF monitoring unit 16 determines whether the monitoring flag FL2 is "1" (step S44). If the monitoring flag FL2 is "1" (step S44: YES), the WAF monitoring unit 16 determines that the return address Add2 is in a used state and therefore, is not an available address and that the return address Add2 is not used in an overlapping manner. The WAF monitoring unit 16 thus sends a reading overlapping determination message that indicates no overlapping to the WAF writing control unit 11 and to the data discarding determining unit 13.

The WAF monitoring unit 16 then writes "0" to the memory area that is of the WAF monitoring buffer 15 and corresponds to the return address Add2 and thereby, changes the value of the monitoring flag FL2 corresponding to the return address Add2 to "0" (step S45). As a result, the return address Add2 is received as an available address and a memory area that is of the shared buffer SB and corresponds to the return address Add2 is indicated as a memory area in an unused state.

When the WAF writing control unit 11 receives the reading overlapping determination message indicating no overlapping, the WAF writing control unit 11 designates a cyclic address for the write address Fifo 5 and stores the return address Add2 in a memory area that is of the write address Fifo 5 and corresponds to the cyclic address, as an available address. When the data discarding determining unit 13 receives the reading overlapping determination message indicating no overlapping and a message of the absence of an error from the parity check unit 12, the data discarding determining unit 13 transfers to the frame demultiplexing unit 14, layer 2 frame data transferred from the shared buffer SB. As a result, the layer 2 frame data is transferred based on output port information output from the reading control unit 10 (step S46), at which a series of steps of the data reading operation is ended.

At step S44, if the monitoring flag FL2 is not "1", that is, the monitoring flag FL2 is "0" (step S44: NO), the WAF monitoring unit 16 determines that the return address Add2 is an available address and is, therefore, used in an overlapping manner. The WAF monitoring unit 16 thus sends a reading overlapping determination message that indicates overlapping to the WAF writing control unit 11 and to the data discarding determining unit 13 (step S47).

When the WAF writing control unit 11 receives the reading overlapping determination message indicating overlapping, the WAF writing control unit 11 discards the return address Add2. When the data discarding determining unit 13 receives the reading overlapping determination message indicating overlapping or a message of the presence of an error from the parity check unit 12, the data discarding determining unit 13 discards layer 2 frame data transferred from the shared buffer SB to the data discarding determining unit 13 (step S48), at which a series of steps of the data reading operation is ended.

An operation of writing or reading layer 2 frame data to or from the shared buffer SB will hereinafter be described by indicating specific examples of the shared buffer SB, the write address Fifo 5, the WAF monitoring buffer 15, and the reading queues 8_1 to 8_4.

Figure 11:
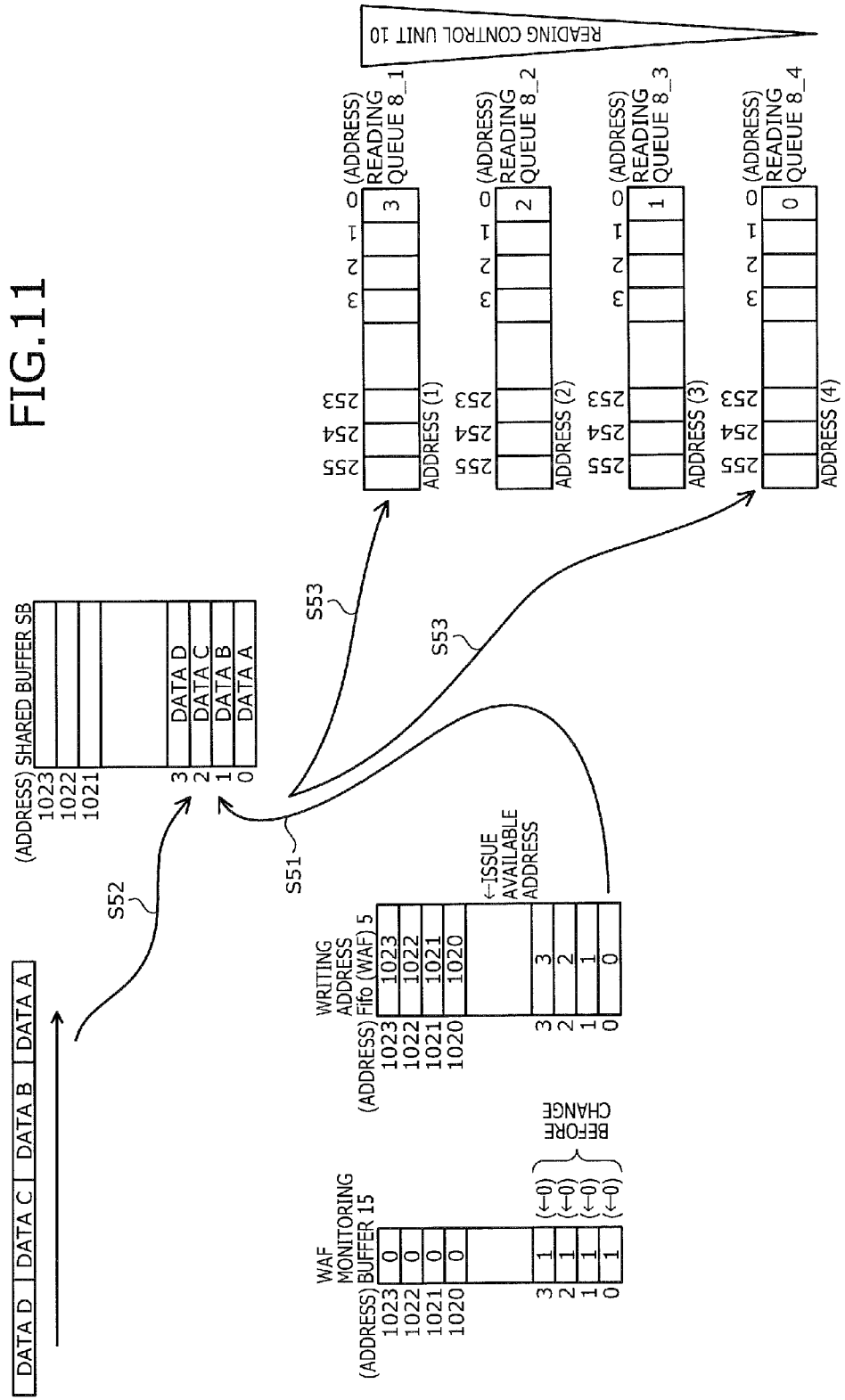
FIG. 11 depicts an example of a data writing operation in a normal situation.

FIG. 11 depicts an example of a data writing operation in a normal situation. FIG. 11 indicates a state where consecutive layer 2 frame data A to D are already stored in the shared buffer SB.

Right after the power supply is turned on or a reset state is canceled, for example, all address spaces of the WAF monitoring buffer 15 are initialized to "0". At this time, values in all address spaces of the write address Fifo 5 are identical to the values of addresses for the write address Fifo 5. This means that if the value of an address for the write address Fifo 5 is "0", a value in the write address Fifo 5 memory area that corresponds to the address of "0" is "0" and that a value in the write address Fifo 5 memory area that corresponds to an address of "1023" is "1023".

No identical values exist in the write address Fifo 5. Because the values of addresses for the shared buffer SB are stored in the write address Fifo 5, the addresses for the shared buffer SB do not overlap each other in the initial state. The shared buffer SB and the reading queues 8_1 to 8_4 are configured to perform first-in first out (FIFO) data processing and therefore, do not need to be initialized.

A case indicated in FIG. 11 will be described, in which, for example, layer 2 frame data A, B, C, and D arrive at the switch card SWC sequentially. At the arrival of the layer 2 frame data A, the WAF reading control unit 2 designates a cyclic address "0" for the write address Fifo 5 and acquires an available address "0" saved in a memory area that is of the write address Fifo 5 and corresponds to the cyclic address "0".

The WAF monitoring unit 16 designates the available address "0" for the WAF monitoring buffer 15 and acquires a monitoring flag stored in a memory area that is of the WAF monitoring buffer 15 and corresponds to the available address "0". The value of the monitoring flag is initialized to "0", so that the WAF monitoring unit 16 changes the value of the monitoring flag stored in the memory area that is of the WAF monitoring buffer 15 and corresponds to the available address "0", to "1".

The WAF reading control unit 2 issues the available address "0" to the shared buffer SB, as a write address (step S51). The shared buffer SB stores the layer 2 frame data A in the memory area thereof corresponding to the write address "0" (step S52). The writing control unit 6 stores the write address "0" in, for example, the reading queue 8_4 (step S53).

Operations to be executed following the arrival of the layer 2 frame data B, C, and D are the same as the above operations. When the layer 2 frame data B arrives at the switch card, however, the WAF reading control unit 2 designates a cyclic address "1" for the write address Fifo 5 and acquires an available address "1" from the write address Fifo 5. The shared buffer SB thus stores the layer 2 frame data B in the memory area thereof corresponding to the available address "1", i.e., write address "1". The writing control unit 6 stores the write address "1" in, for example, the reading queue 8_3.

When the layer 2 frame data C arrives at the switch card, a cyclic address is "2" and an available address is "2". Thus, the layer 2 frame data C is stored in a memory area that is of the shared buffer SB and corresponds to a write address "2", and the write address "2" is stored in, for example, the reading queue 8_2.

When the layer 2 frame data D arrives at the switch card, a cyclic address is "3" and an available address is "3". Thus, the layer 2 frame data D is stored in a memory area that is of the shared buffer SB and corresponds to a write address "3", and the write address "3" is stored in, for example, the reading queue 8_1. The state up to this point is depicted in FIG. 11.

Figure 12:
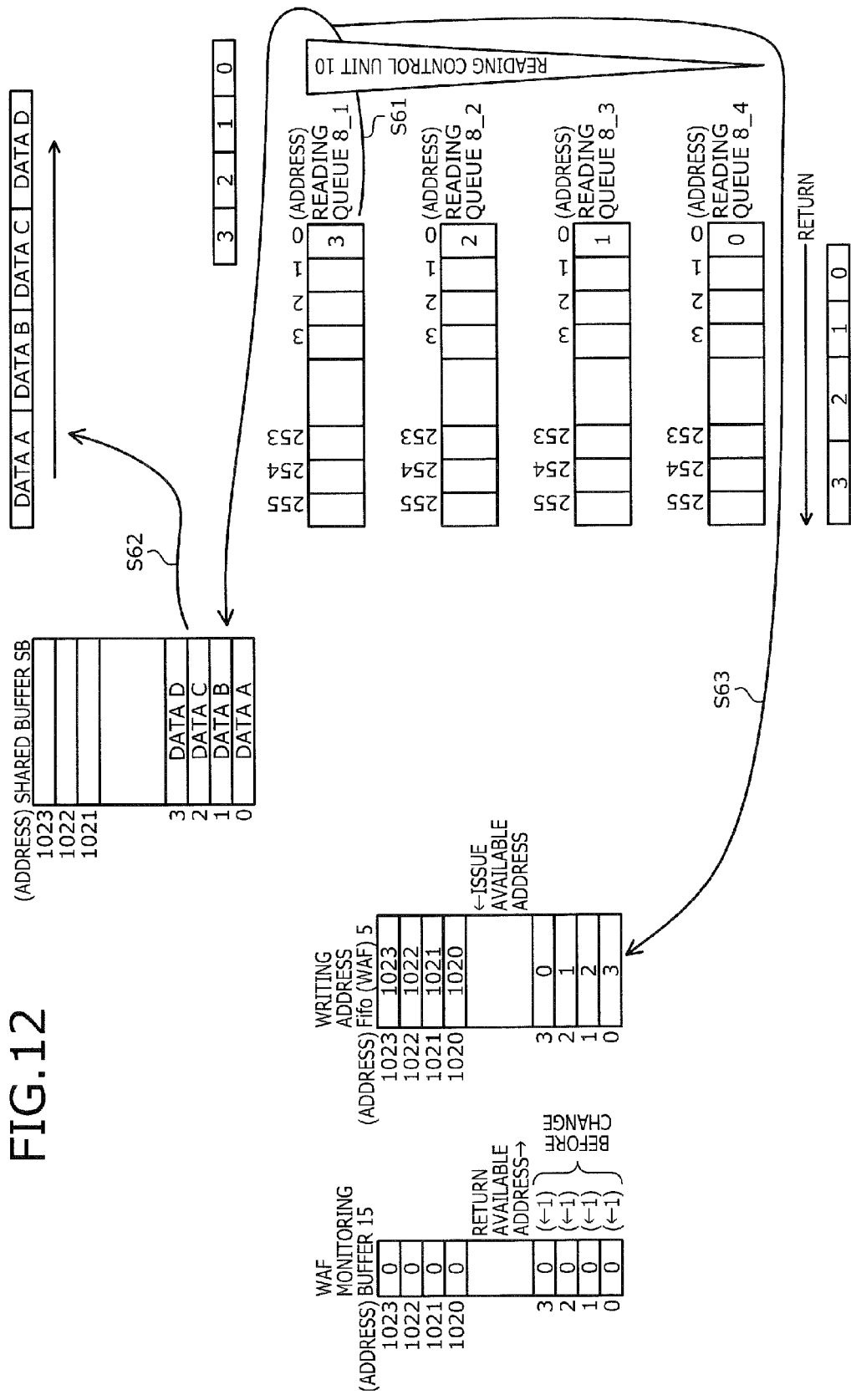
FIG. 12 depicts an example of a data reading operation in a normal situation.

FIG. 12 depicts an example of a data reading operation in a normal situation. FIG. 12 indicates a state where layer 2 frame data A to D have already been read out from the shared buffer SB.

A case indicated in FIG. 12 will be described, in which, for example, layer 2 frame data D, C, B, and A are transferred sequentially from the switch card SWC to the LIU cards C#0 to C#3. Because this is a reading operation in a normal situation, no error is detected at the parity check units 9_1 to 9_4 and the parity check unit 12.

Through priority control and parity control, the reading control unit 10 acquires a write address "3" from the reading queue 8_1. The reading control unit 10 transfers the write address "3" to the shared buffer SB, as a read address "3" and to the WAF writing control unit 11 and the WAF monitoring unit 16, as a return address (step S61).

The layer 2 frame data D is read out from a memory area that is of the shared buffer SB and corresponds to the read address "3" (step S62). The WAF monitoring unit 16 designates a return address "3" for the WAF monitoring buffer 15 and acquires a monitoring flag stored in a memory area that is of the WAF monitoring buffer 15 and corresponds to the return address "3". The value of the monitoring flag is "1", so that the WAF monitoring unit 16 changes the value of the monitoring flag stored in the memory area that is of the WAF monitoring buffer 15 and corresponds to the return address "3", to "0".

The WAF writing control unit 11 designates, for example, a cyclic address "0" for the write address Fifo 5 and stores, as an available address, the return address "3" in a memory area that is of the write address Fifo 5 and corresponds to the cyclic address "0" (step S63). The layer 2 frame data D read out from the shared buffer SB is transferred through the data discarding determining unit 13 to the frame demultiplexing unit 14 and from the frame demultiplexing unit 14 to the LIU cards C#0 to C#3.

Operations of reading out the layer 2 frame data C, B, and A are the same as the above operations. When the layer 2 frame data C is read out, however, the reading control unit 10 acquires a write address "2" from the reading queue 8_2. As a result, a read address transferred to the shared buffer is "2" and a return address transferred to the WAF writing control unit 11 and the WAF monitoring unit 16 is "2".

Thus, the layer 2 frame data C is read out from a memory area that is of the shared buffer SB and corresponds to the read address "2", and the value of a monitoring flag stored in a memory area that is of the WAF monitoring buffer 15 and corresponds to the return address "2" is changed from "1" to "0". The WAF writing control unit 11 designates, for example, a cyclic address "1" for the write address Fifo 5 and stores, as an available address, the return address "2" in a memory area that is of the write address Fifo 5 and corresponds to the cyclic address "1".

When the layer 2 frame data B is read out, a write address, a read address, and a return address that are read out from the reading queue 8_3 are respectively "1". The layer 2 frame data B is, therefore, read out from a memory area that is of the shared buffer SB and corresponds to the read address "1", and the value of a monitoring flag stored in a memory area that is of the WAF monitoring buffer 15 and corresponds to the return address "1" is changed from "1" to "0". The WAF writing control unit 11 designates, for example, a cyclic address "2" for the write address Fifo 5 and stores, as an available address, the return address "1" in a memory area of the write address Fifo 5 that corresponds to the cyclic address "2".

When the layer 2 frame data A is read out, a write address, a read address, and a return address is that are read out from the reading queue 8_4 are respectively "0". The layer 2 frame data A is, therefore, read out from a memory area that is of the shared buffer SB and corresponds to the read address "0", and the value of a monitoring flag stored in a memory area of the WAF monitoring buffer 15 that corresponds to the return address "0" is changed from "1" to "0". The WAF writing control unit 11 designates, for example, a cyclic address "3" for the write address Fifo 5 and stores, as an available address, the return address "0" in a memory area that is of the write address Fifo 5 and corresponds to the cyclic address "3". The process up to this point is depicted in FIG. 12.

Figure 13:
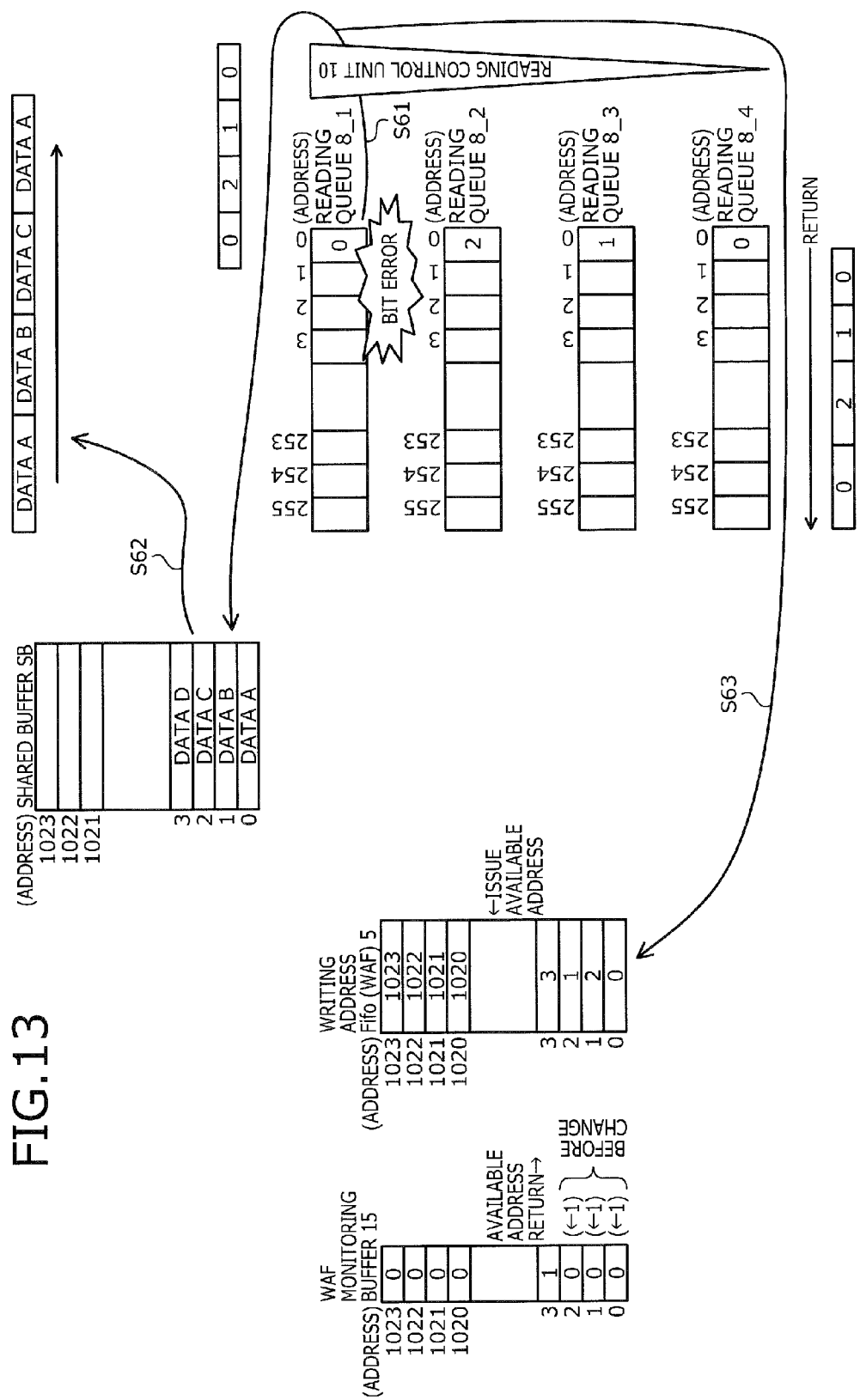
FIG. 13 depicts an example of a reading operation during which a bit error occurring at the reading queue cannot be detected.

FIG. 13 depicts an example of a reading operation during which a bit error occurring at the reading queue cannot be detected. FIG. 13 indicates a state where the layer 2 frame data A to C have already been read out from the shared buffer SB when a bit error has occurred.

A case indicated in FIG. 13 will be described, in which, for example, a bit error occurs at the reading queue 8_1 after the state of FIG. 11 results following the end of normal writing operation and the parity check unit 9_1 cannot detect the bit error. In this case, the parity check unit 12 does not detect the error.

Through priority control and parity control, the reading control unit 10 acquires a write address from the reading queue 8_1. The value of the write address read out from the reading queue 8_1 is supposed to be "3" but is "0" because of the occurrence of the bit error. The reading control unit 10 transfers the write address "0" to the shared buffer SB, as a read address "0" and to the WAF writing control unit 11 and the WAF monitoring unit 16, as a return address (step S61).

The layer 2 frame data A is read out from a memory area that is of the shared buffer SB and corresponds to the read address "0" (step S62). The WAF monitoring unit 16 designates a return address "0" for the WAF monitoring buffer 15 and acquires a monitoring flag stored in a memory area that is of the WAF monitoring buffer 15 and corresponds to the return address "0". The value of the monitoring flag is "1", which leads to a reading overlapping determination of no overlapping. The WAF monitoring unit 16 changes the value of the monitoring flag stored in the memory area that is of the WAF monitoring buffer 15 and corresponds to the return address "0", to "0".

The WAF writing control unit 11 designates, for example, a cyclic address "0" for the write address Fifo 5 and stores, as an available address, the return address "0" in a memory area that is of the write address Fifo 5 and corresponds to the cyclic address "0" (step S63). The layer 2 frame data A read out from the shared buffer SB is transferred through the data discarding determining unit 13 to the frame demultiplexing unit 14 and from the frame demultiplexing unit 14 to the LIU cards C#0 to C#3.

Subsequently, a write address "2" is read out from the reading queue 8_2, and the layer 2 frame data C is read out from the shared buffer SB. The value of a monitoring flag stored in a memory area that is of the WAF monitoring buffer 15 and corresponds to a return address "2" is changed to "0", and the return address "2" is stored, as an available address, in a memory area that is of the write address Fifo 5 and corresponds to a cyclic address "1". The layer 2 frame data C is transferred through the data discarding determining unit 13 to the frame demultiplexing unit 14 and from the frame demultiplexing unit 14 to the LIU cards C#0 to C#3.

Subsequently, a write address "1" is read out from the reading queue 8_3, and the layer 2 frame data B is read out from the shared buffer SB. The value of a monitoring flag stored in a memory area that is of the WAF monitoring buffer 15 and corresponds to a return address "1" is changed to "0", and the return address "1" is stored, as an available address, in a memory area that is of the write address Fifo 5 and corresponds to a cyclic address "2". The layer 2 frame data B is transferred through the data discarding determining unit 13 to the frame demultiplexing unit 14 and from the frame demultiplexing unit 14 to the LIU cards C#0 to C#3.

Subsequently, a write address "0" is read out from the reading queue 8_4, and the layer 2 frame data A is read out from the shared buffer SB. The WAF monitoring unit 16 designates a return address "0" for the WAF monitoring buffer 15 and acquires a monitoring flag stored in a memory area that is of the WAF monitoring buffer 15 and corresponds to the return address "0". The value of the monitoring flag is "0", which leads to a reading overlapping determination of overlapping.

As a result, the layer 2 frame data A read out from the shared buffer SB is discarded by the data discarding determining unit 13 and therefore, is not transferred to the LIU cards C#0 to C#3. An address "3" for the shared buffer SB is not returned to the write address Fifo 5, as an available address. As a result, the value of a monitoring flag in a memory area that is of the WAF monitoring buffer 15 and corresponds to the address "3" remains "1".

FIG. 14 depicts an example of a writing operation during which a bit error occurs at the write address Fifo 5. FIG. 14 indicates a state where, for example, consecutive layer 2 frame data E, F, G, and H arrive sequentially at the switch card SWC and the layer 2 frame data E, F, and G are already stored in the shared buffer SB.

A case indicated in FIG. 14 will be described, in which a bit error occurs at the write address Fifo 5 after the process of reading out the layer 2 frame data A to D is ended normally through the reading operation depicted in FIG. 12. It is assumed that before the occurrence of a bit error, "3", "2", "1", and "0" are stored in memory areas of the write address Fifo 5 that correspond to cyclic addresses "0", "1", "2", and "3", respectively, that the values of monitoring flags that are in the WAF monitoring buffer 15 and correspond to the addresses "0", "1", "2", and "3" are all "0", and that because of a bit error having occurred in the memory area that is of the write address Fifo 5 and corresponds to the cyclic address "3", the value of an available address in the memory area that is supposed to be "0" has become "3".

At the arrival of the layer 2 frame data E, the WAF reading control unit 2 designates the cyclic address "0" for the write address Fifo 5 and acquires an available address "3" saved in the memory area that is of the write address Fifo 5 and corresponds to the cyclic address "0".

The WAF monitoring unit 16 designates an available address "3" for the WAF monitoring buffer 15 and acquires a monitoring flag stored in a memory area that is of the WAF monitoring buffer 15 and corresponds to the available address "3". The value of the monitoring flag is initialized to "0", so that the WAF monitoring unit 16 changes the value of the monitoring flag stored in the memory area that is of the WAF monitoring buffer 15 and corresponds to the available address "3", to "1".

The WAF reading control unit 2 issues the available address "3" to the shared buffer SB, as a write address (step S51). The shared buffer SB stores the layer 2 frame data E in the memory area thereof corresponding to the write address "3" (step S52). The writing control unit 6 stores the write address "3" in, for example, the reading queue 8_1 (step S53).

Operations to be executed following the arrival of the layer 2 frame data F and G are the same as the above operations. When the layer 2 frame data F arrives at the switch card, however, the WAF reading control unit 2 designates the cyclic address "1" for the write address Fifo 5 and acquires an available address "2" from the write address Fifo 5. The shared buffer SB thus stores the layer 2 frame data F in a memory area thereof corresponding to the available address "2", i.e., write address "2". The writing control unit 6 stores the write address "2" in, for example, the reading queue 8_2.

When the layer 2 frame data G arrives at the switch card, the cyclic address is "2" and an available address is "1". Thus, the layer 2 frame data G is stored in a memory area that is of the shared buffer SB and corresponds to a write address "1", and the write address "1" is stored in, for example, the reading queue 8_3.

At the arrival of the layer 2 frame data H, the WAF reading control unit 2 designates the cyclic address "3" for the write address Fifo 5 and acquires an available address "3" saved in the memory area that is of the write address Fifo 5 and corresponds to the cyclic address "3".

The WAF monitoring unit 16 designates an available address "3" for the WAF monitoring buffer 15 and acquires a monitoring flag stored in a memory area that is of the WAF monitoring buffer 15 and corresponds to the available address "3". The value of the monitoring flag is "1", which leads to a writing overlapping determination of overlapping. As a result, the available address "3" issued from the WAF reading control unit 2 is not transferred to the shared buffer SB and the reading queues 8_1 to 8_4 but rather is discarded. The layer 2 frame data H is not written to the shared buffer SB but rather is discarded.

The switch unit SP may restore an address for the shared buffer SB that has been discarded because of a determination that the address is overlapping. For example, layer 2 frame data is written to the shared buffer SB in one monitoring cycle during which layer 2 frame data is invariably read out from the shared buffer SB, and then an address space of the shared buffer SB from which layer 2 frame data has not been read out is detected in the next monitoring cycle. This detected address space may be released as an available address of the shared buffer SB.

According to the switch card SWC of FIG. 7, when layer 2 frame data is written to the shared buffer SB, whether an available address issued as a write address is overlapping is determined, and when the issued available address is overlapping, the available address is discarded. This prevents missing layer 2 frame data. When layer 2 frame data is read out from the shared buffer SB, whether a read address is overlapping is determined, and if the read address is overlapping, the returned read address is not received. This prevents the continuation of overlapping of addresses for the shared buffer SB. When layer 2 frame data is read out from the shared buffer SB, if a read address is overlapping, the layer 2 frame data read out from the shared buffer SB is discarded. This prevents delivery of the layer 2 frame data to an incorrect destination.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data processing apparatus comprising:
   a shared buffer that saves data incoming from a plurality of ports;
   an address issuing unit that when the data incoming from the ports is written to the shared buffer, issues a write address for the shared buffer from among available addresses;
   a return address receiving unit that when the data is read out from the shared buffer, receives a returned read address for the read out data and manages the returned read address as an available address;
   a monitoring buffer that saves information that indicates a use status of an address for the shared buffer; and
   a monitoring unit that monitors issuance of the write address by the address issuing unit and reception of the returned read address by the return address receiving unit, changes contents of the information that is saved by the monitoring buffer and corresponds to the write address to be issued, from an unused state to a used state, when the write address is issued by the address issuing unit, and changes contents of the information that is saved by the monitoring buffer and corresponds to a read address to be returned, from a used state to an unused state when the returned read address is received by the return address receiving unit, wherein
   the monitoring unit determines that the address for the shared buffer is overlapping, when the information that is saved by the monitoring buffer and corresponds to the write address to be issued indicates a used state when the write address is issued by the address issuing unit,
   the monitoring unit determines that the address for the shared buffer is overlapping, when the information that is saved by the monitoring buffer and corresponds to the read address to be returned indicates a unused state when the return address receiving unit receives the returned read address, and
   the return address receiving unit discards the read address, when the monitoring unit determines that the read address to be returned is overlapping.

2. A data processing method performed by one or more processors coupled to a memory, the method comprising:
   saving, in a shared buffer, data incoming from a plurality of ports;
   when the data incoming from the ports is written to the shared buffer, issuing a write address for the shared buffer from among available addresses;
   when the data is read out from the shared buffer, receiving a returned read address for the read out data and managing the returned read address as an available address;
   saving, in a monitoring buffer, information that indicates a use status of an address for the shared buffer;
   monitoring issuance of the write address and reception of the returned read address, changing contents of the information that is saved by the monitoring buffer and corresponds to the write address to be issued, from an unused state to a used state, when the write address is issued, and changing contents of the information that is saved by the monitoring buffer and corresponds to a read address to be returned, from a used state to an unused state when the returned read address is received;
   determining that the address for the shared buffer is overlapping, when the information that is saved by the monitoring buffer and corresponds to the write address to be issued indicates a used state when the write address is issued;
   determining that the address for the shared buffer is overlapping, when the information that is saved by the monitoring buffer and corresponds to the read address to be returned indicates a unused state when the returned read address is received; and
   discarding the read address, when it is determined that the read address to be returned is overlapping.

3. The data processing method according to claim 2, further comprising discarding the write address when the write address is determined to be overlapping.

4. The data processing apparatus according to claim 1, wherein
   the address issuing unit discards the write address to be issued, when the monitoring unit determines that the write address to be issued is overlapping.

* * * * *